United States Patent
Fujikawa et al.

(10) Patent No.: US 7,352,877 B2
(45) Date of Patent: Apr. 1, 2008

(54) DIGITAL-WATERMARK-EMBEDDING AND PICTURE COMPRESSION UNIT

(75) Inventors: Yoshifumi Fujikawa, Sagamihara (JP); Yukio Fujii, Yokohama (JP); Koichi Terada, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 843 days.

(21) Appl. No.: 10/620,603

(22) Filed: Jul. 17, 2003

(65) Prior Publication Data

US 2004/0151341 A1 Aug. 5, 2004

(30) Foreign Application Priority Data

Feb. 4, 2003 (JP) .............................. 2003-026584

(51) Int. Cl.
*G06K 9/00* (2006.01)

(52) U.S. Cl. ...................................... 382/100
(58) Field of Classification Search ................. 382/100
See application file for complete search history.

(56) References Cited

U.S. PATENT DOCUMENTS

| | | | | |
|---|---|---|---|---|
| 6,535,254 | B1 * | 3/2003 | Olsson et al. | 348/607 |
| 6,687,412 | B1 * | 2/2004 | Rao et al. | 382/251 |
| 6,725,372 | B1 * | 4/2004 | Lewis et al. | 713/176 |
| 7,020,304 | B2 * | 3/2006 | Alattar et al. | 382/100 |
| 7,130,443 | B1 * | 10/2006 | Werner et al. | 382/100 |

FOREIGN PATENT DOCUMENTS

JP 2000175019 12/1998

OTHER PUBLICATIONS

Video Information Media Institute Technical Report, Commercial Electronics Media Engineering, Jul. 2002, VIMI Technical Report vol. 26, No. 48, ISSN 1342-6893.

* cited by examiner

*Primary Examiner*—Brian Werner
*Assistant Examiner*—Hadi Akhavannik
(74) *Attorney, Agent, or Firm*—Mattingly, Stanger Malur & Brundidge, P.C.

(57) ABSTRACT

In order to avoid content deteriorations caused by embedment of a digital watermark into a moving picture, a process to search a picture for a motion and a process to filter a picture for medical care must be carried out, raising a processing cost. It is thus difficult to implement equipment for processing such pictures at a low cost. In a compound apparatus for encoding compressed code of a moving picture by employing a unit for embedding a digital watermark into a picture, a digital-watermark embedment quantity is determined by using a motion vector and a quantization parameter in a process to embed a digital watermark into the picture. It is thus no longer necessary to carry out the process to search a picture for a motion and the process to filter a picture for medical care for embedment of a digital watermark so that the cost of the entire apparatus can be reduced substantially.

17 Claims, 19 Drawing Sheets

DIGITAL-WATERMARK-EMBEDDING AND PICTURE COMPRESSION UNIT

BACKGROUND OF THE INVENTION

The present invention relates to a method of embedding information such as copy control information and copyright information into a content such as a static picture or a moving picture as well as relates to an apparatus adopting the method.

In recent years, a content such as a picture and music is digitalized and distributed by means of storage media or a network. In order to protect the copyright of such a digitalized content, a digital-watermark technology has been regarded as an important technology.

To put the digital-watermark technology to practical use, it is necessary to optimize a content's portion to be changed, the degree of content changes or a change intensity in accordance with properties of the content. In the case of a picture, in general, in an area where condition variations of the picture are flat, if improper changes are added to pixel values such as luminance or a color-condition value, unnaturalness looks conspicuous at a changed portion. On the other hand, a picture exhibits a property referred to as a static-picture property, in accordance with which, relatively large changes added to pixels at the picture's portion with large variations in pixel value will not appear conspicuous to the eyes of a human being. An example of such a portion is an edge of the picture. In addition, a picture has a property known as a moving-picture property, in accordance with which, a static portion is sensitive to a noise while a moving portion is insensitive to noises.

Furthermore, targets of embedment of a digital watermark are not limited to a static picture. That is to say, a moving picture can also serve as a target of embedment of a digital watermark as well. A moving picture comprises a plurality of static-picture frames arranged along the time axis. It is to be noted that, during a process to appreciate the moving picture, each of the static-picture frames is appreciated as a static picture in some cases by stopping an operation to feed the frames. For this reason, in a process to embed a digital watermark into a moving picture, it is necessary to make a location of a change in pixel value inconspicuous be the location in a static-picture state or a moving-picture state. In addition, it is desirable to optimize changed pixels and the degree of the change by taking both the static-picture property and the moving-picture property into consideration.

Japanese Patent Laid-open No. 2000-175019 is an example of a document describing a method of embedding a digital watermark into a target by taking both the static-picture property and the moving-picture property into consideration. To be more specific, Japanese Patent Laid-open No. 2000-175019 describes a method of carrying out a process to make changes to luminance of a moving picture as digital watermark information when embedding the digital watermark information into the moving picture, which comprises a plurality of static-picture frames arranged along the time axis. The method comprises the steps of detecting a motion vector (a moving-picture property) for each picture block in a frame of interest, selecting a specification rule of a pixel change rate for each block in accordance with the motion quantity and selecting a number of pixels specified by the specification rule among allowable-luminance-change pixels determined by a state (a static-picture property) of each picture block.

In addition, most moving pictures are pictures compressed by typically adoption of an MPEG technique implemented by hardware or software.

In a conventional apparatus for embedding a digital watermark into a picture and compressing the picture, however, in spite of the fact that a computation of a moving-picture or static-picture property used in a process to embed the digital watermark into a picture is made the same as a computation of a moving-picture or static-picture property used in a process to compress the picture for the purpose of distinguishing a portion showing a conspicuous picture-quality deterioration and a portion showing no conspicuous picture-quality deterioration from each other, the computations are carried out separately from each other. Thus, the total processing cost of the apparatus increases, resulting a hindrance to efforts to raise the speed, reduce the size and lower the price.

In order to solve this problem, in accordance with a method disclosed in "Moving-Picture Watermarking for MPEG Encoders Sustaining Picture Qualities by Detection of Motions" written by Anzai and four other authors, the Institute of Image Information and Television Engineers' Technical Report published by the Institute of Image Information and Television Engineers, July 2002, Vol. 26, No. 48, ISSN 1342-6893, P1-6, a result of a process to search for a motion vector, which is a moving-picture property of a content (or a picture), is shared by a process to embed a digital watermark into the picture and a process to compress the picture in an attempt to reduce the processing cost.

SUMMARY OF THE INVENTION

In the technological disclosure of "Moving-Picture Watermarking for MPEG Encoders Sustaining Picture Qualities by Detection of Motions" written by Anzai and four other authors, the Institute of Image Information and Television Engineers' Technical Report published by the Institute of Image Information and Television Engineers, July 2002, Vol. 26, No. 48, ISSN 1342-6893, P1-6, while a moving-picture property of a content is taken into consideration, computation of a static-picture property is not described.

In addition, in the conventional digital-watermark embedment unit and the conventional compression apparatus, which are included in a typical layout configuration shown in FIG. 1 of Japanese Patent Laid-open No. 2002-300364, computation of a static-picture property used in a compression process is carried out on a picture already including an embedded digital watermark, that is, on a picture with changes made to values of pixels. Thus, a result of the computation of a static-picture property is different from a result of the computation of a static-picture property of the original picture. In addition, a portion including the inserted digital watermark and changes in pixel value is incorrectly recognized as a disorderly picture and a quantization parameter is changed in an increasing direction. As a result, the picture is coarsely quantized so that, in the compression apparatus, the digital watermark of the picture is lost or thinned.

In order to solve the problems described above, the present invention is characterized by comprising:

a means for computing a static-picture property of a content serving as a target of embedment of a digital watermark;

a means for computing a moving-picture property of the content;

a means for embedding a digital watermark into the content by using a result of a computation carried out by the means for computing a static-picture property of the content and a result of a computation carried out by the means for computing a moving-picture property of the content; and a means for compressing the content including the digital-watermark embedded by the means for embedding the digital watermark by using the result of a computation carried out by the means for computing a static-picture property of the content and the result of a computation carried out by the means for computing a moving-picture property of the content.

DESCRIPTION OF THE PREFERRED EMBODIMENTS

In embodiments of the present invention, a moving picture is considered as a content. A moving picture comprises a plurality of static-picture frames arranged along the time axis. A digital watermark can be embedded into a moving picture by adding a change to each of the static-picture frames or to a portion of each of the static-picture frames. In the embodiments described below, a digital watermark is embedded into pixels of each static-picture frame by changing the luminance to a certain degree not sensed by the eyes of a human being. It is to be noted that other methods of embedding a digital watermark into a picture include a technique of raising and reducing numerical values of color components of the picture and a technique of increasing and decreasing a coefficient in the frequency range of the picture luminance or the picture chrominance. This coefficient is referred to as a DCT coefficient.

It is also worth noting that, in the conventional process of embedding a digital watermark into a moving picture, there is considered a case in which the moving picture is stopped to be appreciated as a static picture. The stopped moving picture is then subjected to the steps of computing a static-picture property for each pixel, determining pixels whose luminance can be changed or an allowable-luminance-change range of pixels and computing a static-picture property to be used in a compression process for each compression block. The computation units vary from apparatus to apparatus. On the other hand, the embodiments provide a configuration in which the computation of a static-picture property or a moving-picture property is made common to all apparatus. That is to say, a static-picture property or a moving-picture property is computed for each block and used in all processes. This is because, unlike a static picture, a moving picture has a property that detailed portions' deteriorations that would naturally detected by the sense of sight are not conspicuous.

The embodiments can be applied to some of many moving-picture compression techniques. The moving-picture compression techniques, to which the embodiments can be applied, are a technique of utilizing a motion vector representing a correlation among picture frames and a technique allowing different values of a quantization step for reducing the amount of information to be used for different portions of a picture frame. In the embodiments described below, a compression process is carried out by using I and P pictures of the MPEG-2 (ISO/IEC 13818-2) technique and each static-picture frame has a width of 720 pixels and a height of 480 pixels.

Figure 1:
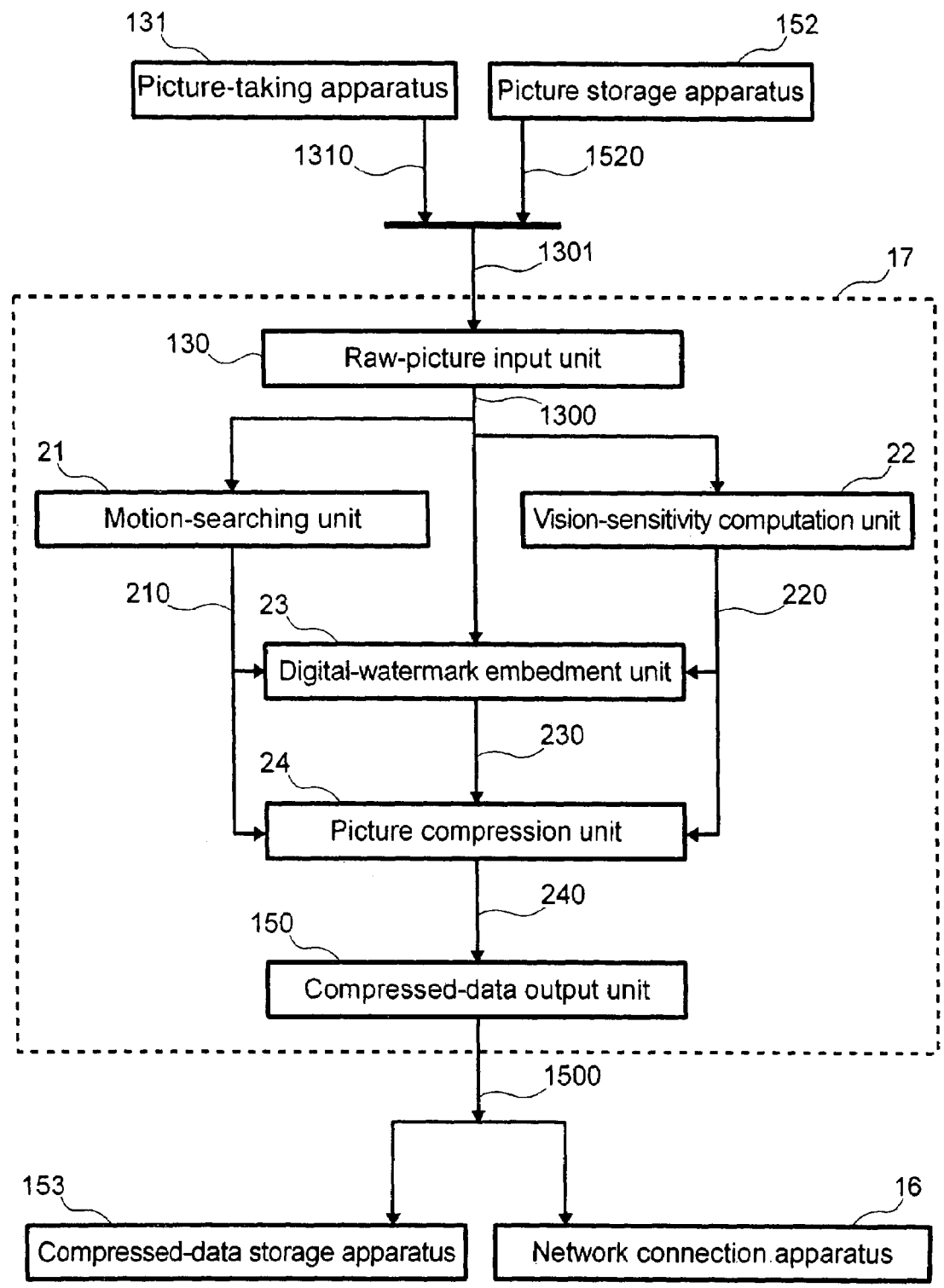
FIG. 1 is an explanatory diagram showing the configuration of a system applying a combination of a moving-picture compression unit and a digital-watermark embedment unit.

First of all, a first embodiment of the present invention is explained by referring to FIG. 1. FIG. 1 is an explanatory diagram showing the configuration of a system for embedding a digital watermark into a moving picture and compressing the moving picture.

The moving picture to be used as a content is taken by using a picture-taking apparatus 131 or a picture already stored in a picture storage apparatus 152. A taken picture 1310 or a stored picture 1520 is supplied to a raw-picture input unit 130 as raw-picture input data 1301. The raw-picture input unit 130 splits the raw-picture input data 1301 into individual static-picture frames and output each of the static-picture frames as a static-picture frame 1300. The static-picture frame 1300 is supplied to a motion-searching unit 21, a noise-vision-sensitivity computation unit 22 and a digital-watermark embedment unit 23.

The motion-searching unit 21 searches the static-picture frames for a motion vector representing a motion of the moving picture and outputs a result of the search process to the digital-watermark embedment unit 23 and a picture compression unit 24 as a motion-searching vector 210. On the other hand, the noise-vision-sensitivity computation unit 22 computes a noise-vision-sensitivity index representing a human being's sensitivity to a noise contained in the picture, outputting a result of the computation to the digital-watermark embedment unit 23 and the picture compression unit 24 as a noise-vision-sensitivity index 220.

The digital-watermark embedment unit 23 embeds a digital watermark into the static-picture frame 1300 by using the motion-searching vector 210 and the noise-vision-sensitivity index 220, outputting a result of the embedment to the picture compression unit 24 as an embedded-digital-watermark-containing picture frame 230. The picture compression unit 24 compresses the embedded-digital-watermark-containing picture frame 230 by using the motion-searching vector 210 and the noise-vision-sensitivity index 220, supplying output picture compressed data 240 to a compressed-data output unit 150.

The compressed-data output unit 150 converts the output picture compressed data 240 into a continuous data sequence by properly buffering the output picture compressed data 240, supplying the data sequence to a compressed-data storage apparatus 153 and/or a network connection apparatus 16 as output compressed data 1500. The compressed-data storage apparatus 153 stores the output compressed data 1500 in a storage medium. On the other hand, the network connection apparatus 16 transmits the output compressed data 1500 to an apparatus connected to the network connection apparatus 16 by a network.

In the configuration described above, a static-picture property to be used in a compression process is computed from a picture before a digital watermark is embedded into the picture. As a result, it is possible to avoid a compression process by incorrectly recognizing a picture including an embedded digital watermark as a disorderly picture.

Figure 7:
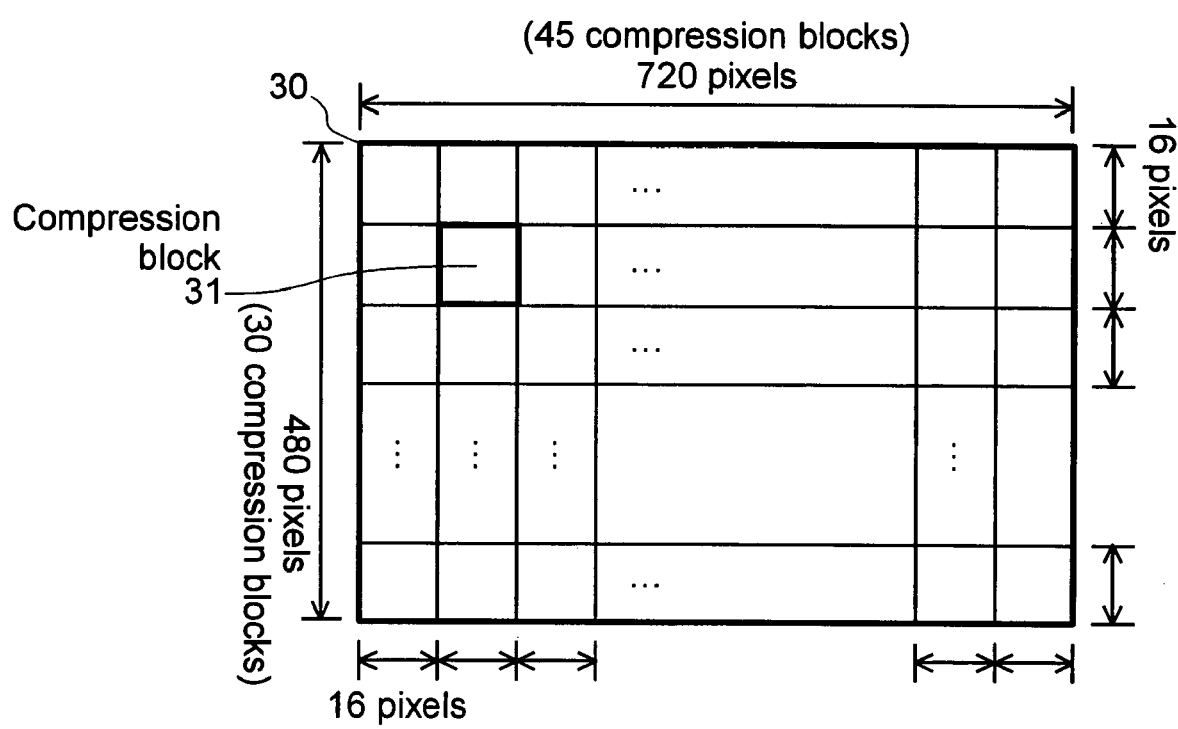
FIG. 7 is an explanatory diagram showing an individual static-picture frame of a moving picture and compression blocks of the picture frame.

The following description explains detailed operations carried out by apparatus composing the system shown in FIG. 1. A static-picture frame 30 is split into compression blocks 31 each having a width of 16 pixels and a height of 16 pixels as shown in FIG. 7. Then, for each of the compression blocks 31, the motion-searching unit 21 searches a static-picture frame 30 for a motion vector 210 whereas the noise-vision-sensitivity computation unit 22 computes a noise-vision-sensitivity index 220.

Figure 9:
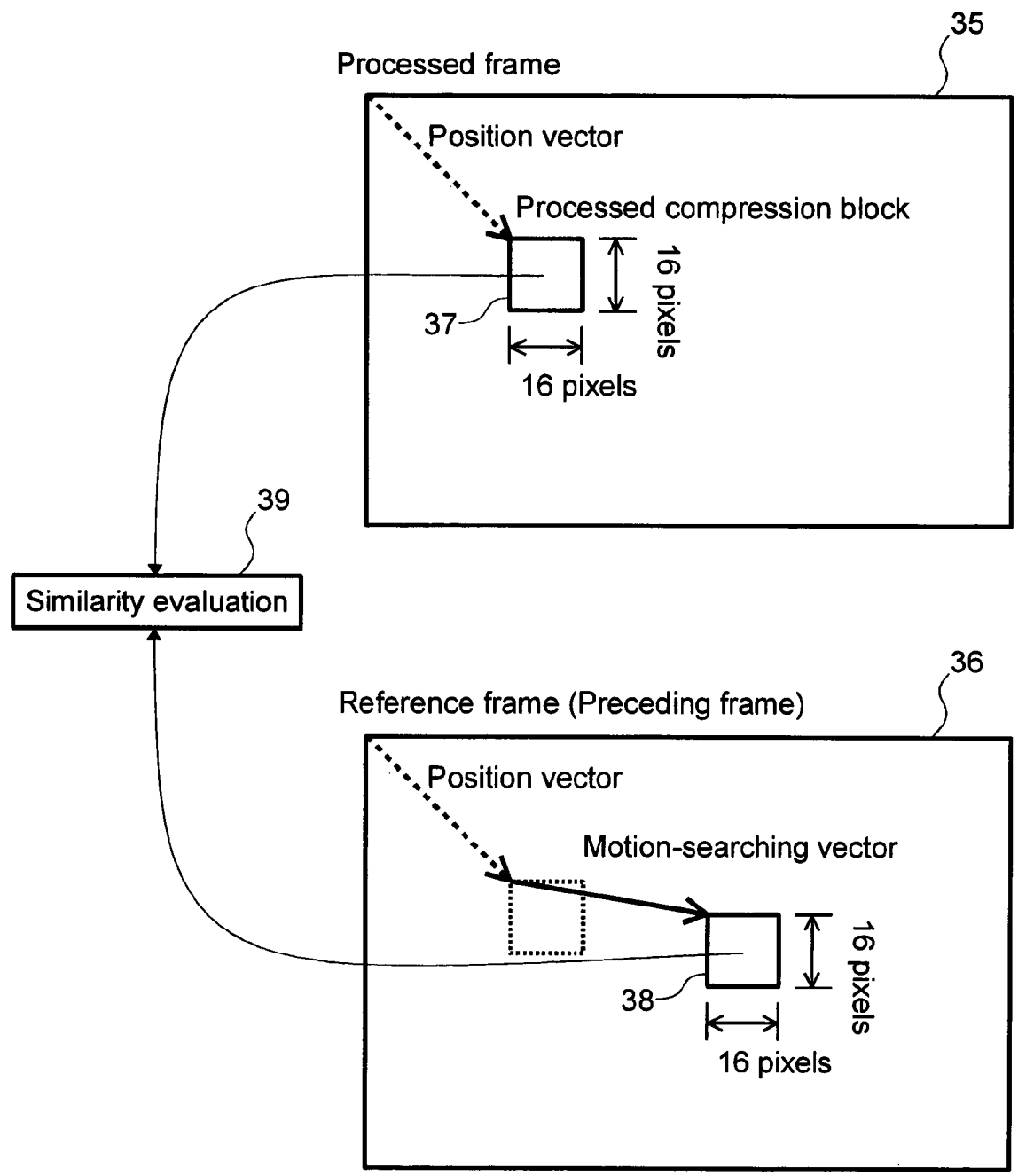
FIG. 9 is an explanatory diagram showing a search for a motion.

As shown in FIG. 9, the motion-searching unit 21 searches a presently processed static-picture frame 35 for a motion vector by searching an immediately preceding reference static-picture frame 36 for the position of a compression block 38 most similar to a currently processed compression block 37 in the presently processed static-picture frame 35.

The search process is carried out in accordance with the following procedure. First of all, the position of a specific block in the reference frame 36 is taken as an origin. The position of the specific block in the reference frame 36 is represented by the same position vector as the position vector representing the currently processed compression block 37. A motion vector found in the search process is a vector representing the position of the compression block 38, which is also referred to as a motion-inference block. The vector representing the position of the compression block 38 is referred to as a motion-searching vector, which is relative to the origin. Much like other compression blocks, the compression block 38 has a width of 16 pixels and a height of 16 pixels. Then, a similarity evaluation process 39 is carried out by comparing the pixel values of the motion-inference block 38 with the pixel values of the currently processed compression block 37. To put it in detail, by changing the motion-searching vector, the similarity evaluation process 39 is carried out to determine a position, at which a compression block 38 most similar to the currently processed compression block 37 is located. The motion-searching vector representing such a position is the motion vector cited above. In the similarity evaluation process 39, Eq. (1) is used. Eq. (1) is an evaluation equation. A position corresponding to a smallest value of the expression on the right-hand side of the evaluation equation is determined to be a position, at which a compression block 38 most similar to the currently processed compression block 37 is located. As a result of the search operation, a motion-searching vector 210 is output for each compression (macro-) block. Finally, the motion-searching unit 21 stores the input picture frame 1300 in a memory as the immediately preceding reference frame to be used in the next search operation.

$$MAD_{u,v} = \frac{1}{M \cdot N} \sum_{i=0}^{M-1} \sum_{j=0}^{N-1} |P_{x+i,y+j} - P'_{x+i+u,y+j+v}| \tag{1}$$

where:
M=16 pixels: the width of a compression block
N=16 pixels: the height of a compression block
$P_{ij}$: the luminance value of a pixel on a ith column from the left edge of the currently processed frame and a jth row from the top of the frame
$P'_{i,j}$: the luminance value of a pixel on a ith column from the left edge of the reference frame and a jth row from the top of the frame
x,y: Coordinates of the position of a pixel at a left upper corner of a currently processed block in the frame (Components of the position vector)
u,v: Components of the motion-searching vector
$MAD_{u,v}$: The value of the expression on the right-hand side of the evaluation equation for the motion-searching vector (u, v)

Figure 4:
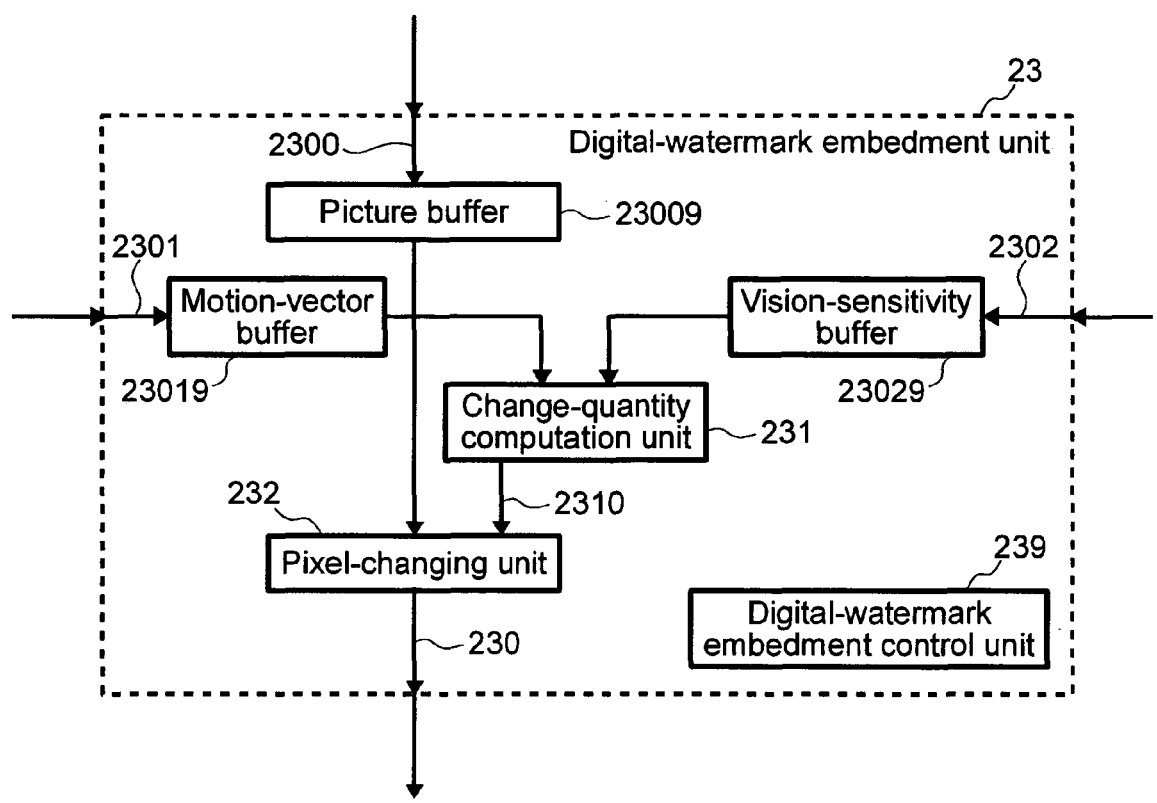
FIG. 4 is an explanatory diagram showing the configuration of the digital-watermark embedment unit employed in the system.

The noise-vision-sensitivity index 220 computed by the noise-vision-sensitivity computation unit 22 is an indicator representing the degree of noise recognition by a human being or a human being's sense of incompatibility with a noise for each compression block 31 of the moving picture's frame treated like a static picture. In this embodiment, the quantity of a noise, with which a human being feels a sense of incompatibility, is expressed by a number. In general, a model representing how a human being feels a noise is complicated. In this embodiment, however, a computation formula using a variance of the pixel luminance as expressed by Eq. (2) is used as the model in order to make the description simple. This computation formula is based on a property that a picture's portion with a small luminance variance is a flat portion and the eyes of a human being are sensitive to a noise generated on such a flat portion whereas a picture's portion with a large luminance variance is a non-flat portion and the eyes of a human being are insensitive to a noise generated on such a non-flat portion. The noise-vision-sensitivity computation unit 22 finds the value of an expression on the right-hand side of Eq. (2) for each compression block 31 and outputs the value as a noise-vision-sensitivity index 220.

$$\sigma^2 = \frac{1}{M \cdot N} \sum_{i=0}^{M-1} \sum_{j=0}^{N-1} (P_{x+i,y+j})^2 - \left( \frac{1}{M \cdot N} \sum_{i=0}^{M-1} \sum_{j=0}^{N-1} P_{x+i,y+j} \right)^2 \quad (2)$$

$$NS = 1 + \sigma$$

where:
M=16 pixels: the width of a compression block
N=16 pixels: the height of a compression block
$P_{ij}$: the luminance value of a pixel on a ith column from the left edge of the currently processed frame and a jth row from the top of the frame
x,y: Coordinates of the position of a pixel at a left upper corner of a currently processed block in the frame (Components of the position vector)
$\sigma^2$: the variance of the luminance
NS: the noise-vision-sensitivity index The configuration of the digital-watermark embedment unit 23 is shown in FIG. 4. The digital-watermark embedment unit 23 receives the static-picture frame 1300, the motion-searching vector 210 and the noise-vision-sensitivity index 220, which are shown in FIG. 1, as respectively a digital-watermark-embedment-target-picture frame 2300, a digital-watermark motion vector 2301 and a digital-watermark noise-vision-sensitivity index 2302, which are shown in FIG. 4. The digital-watermark motion vector 2301 and the digital-watermark noise-vision-sensitivity index 2302 are supplied to a change-quantity computation unit 231 by way of a motion-vector buffer 23019 and a vision-sensitivity-index buffer 23029 respectively. The change-quantity computation unit 231 computes the quantity of a change to be used in a process to embed a digital watermark, and outputs the quantity of a change to a pixel-changing unit 232 as a pixel-change quantity 2310. In addition to the pixel-change quantity 2310, the pixel-changing unit 232 also receives the digital-watermark-embedment-target-picture frame 2300 from a picture buffer 23009, and changes the luminance of each pixel on the digital-watermark-embedment-target-picture frame 2300 with the pixel-change quantity 2310 computed for the pixel. The pixel-changing unit 232 then outputs the digital-watermark-embedment-target-picture frame 2300 containing the changed pixels as an embedded-digital-watermark-containing frame 230.

A digital-watermark-embedment control unit 239 controls all operation timings of the digital-watermark embedment unit 23. In order to adjust operation timings among functional units employed in the digital-watermark embedment unit 23, in general, control is executed to put input data in a queue till a functional unit that will require the data makes a request for the data. To be more specific, the motion-vector buffer 23019, the vision-sensitivity-index buffer 23029 and the picture buffer 23009 are each controlled to hold predetermined data stored therein till a certain time. For example, a digital-watermark motion vector 2301 and a digital-watermark noise-vision-sensitivity index 2302 already stored in the motion-vector buffer 23019 and the vision-sensitivity-index buffer 23029 respectively are supplied to the change-quantity computation unit 231 when the change-quantity computation unit 231 requires these pieces of data for computing a pixel-change quantity 2310. As another technique of controlling a timing, it is also possible to execute control so that, when pieces of predetermined data are received completely in the motion-vector buffer 23019 and the vision-sensitivity-index buffer 23029, these pieces of predetermined data are supplied to the change-quantity computation unit 231. On the other hand, when the change-quantity computation unit 231 outputs the pixel-change quantity 2310 to the pixel-changing unit 232, a digital-watermark-embedment-target-picture frame 2300 is supplied from the picture buffer 23009 to the pixel-changing unit 232.

A pixel-change quantity 2310 to be used in a process of embedding a digital watermark into a picture indicates how much the luminance of the picture is to be changed in the process. The pixel-change quantity 2310 needs to be set at a large possible degree with which a human being still does not feel incompatible. This is because, if the pixel-change quantity 2310 is too small, a digital watermark embedded by using the pixel-change quantity 2310 may be difficult to detect due to distortions, which are caused by shrinking/enlargement and compression of the picture. A human being's sense of sight is sensitive to a noise in a picture's portion with few motions but insensitive to a moving portion of the picture.

In the digital-watermark embedment unit 23 shown in FIG. 4, the pixel-change quantity 2310 is computed by using the digital-watermark noise-vision-sensitivity index 2302 and the digital-watermark motion vector 2301. The digital-watermark noise-vision-sensitivity index 2302 is a human being's characteristic with respect to a static picture. On the other hand, the digital-watermark motion vector 2301 is a vector indicating a motion. Specially, in the case of this embodiment, the pixel-change quantity 2310 is computed by using Tables 1 and 2 as well as Eq. (3). Table 1 is a table showing a relation between the magnitude of the motion vector 2301 and a motion-vector factor coefficient of the pixel-change quantity 2310. On the other hand, Table 2 is a table showing a relation between the noise-vision-sensitivity index 2302 and a vision-sensitivity factor coefficient of the pixel-change quantity 2310. First of all, in a process to compute a pixel-change quantity 2310, the digital-watermark motion vector 2301 is converted into a motion-vector factor coefficient of the pixel-change quantity 2310 by using Table 1. Then, the digital-watermark noise-vision-sensitivity index 2302 is converted into a vision-sensitivity factor coefficient of the pixel-change quantity 2310 by using Table 2.

TABLE 1

| Motion-vector quantity $\|MV\| = \sqrt{u^2+v^2}$ | Motion-vector factor coefficient of change quantity FMV |
|---|---|
| <MVTH (=10) | 1.0 |
| ≥MVTH (=10) | 1.5 |

TABLE 2

| Noise-vision-sensitivity index NS | Vision-sensitivity factor coefficient of change quantity FMS |
|---|---|
| ≤31 | $\dfrac{NS}{2}$ |
| >31 | 16 |

Then, Eq. (3) is applied to the results of the conversions, that is, the motion-vector factor coefficient and the vision-sensitivity factor coefficient, in order to compute a pixel-change quantity 2310 of the luminance value. A result of the computation according to Eq. (3) is the pixel-change quantity 2310. If a constant k for determining an embedment intensity used in Eq. (3) is raised, the change quantity also increases, causing the digital watermark to become an obstruction to the eye. However, the digital watermark hardly disappear due to distortions, which are caused by shrinking/enlargement and compression of the picture. If the constant is reduced, on the other hand, the change quantity also decreases, resulting in a digital watermark that is easily affected by distortions caused by shrinking/enlargement and compression of the picture.

$$d = k \cdot FNS \cdot FMV \quad (3)$$

where
FNS: Vision-sensitivity factor coefficient
FMV: Motion-vector factor coefficient
k=1: Constant for determining an embedment intensity
d: Change quantity of pixel luminance Next, a method adopted by the pixel-changing unit 232 to change pixel luminance is explained. As an example, an embedded digital watermark is an array of 48 bits. This array of digital watermark bits is denoted by reference numeral 33 in FIG. 8. Reference numeral 34 denotes an embedded digital watermark bit in the digital watermark-bit array 33.

Figure 8:
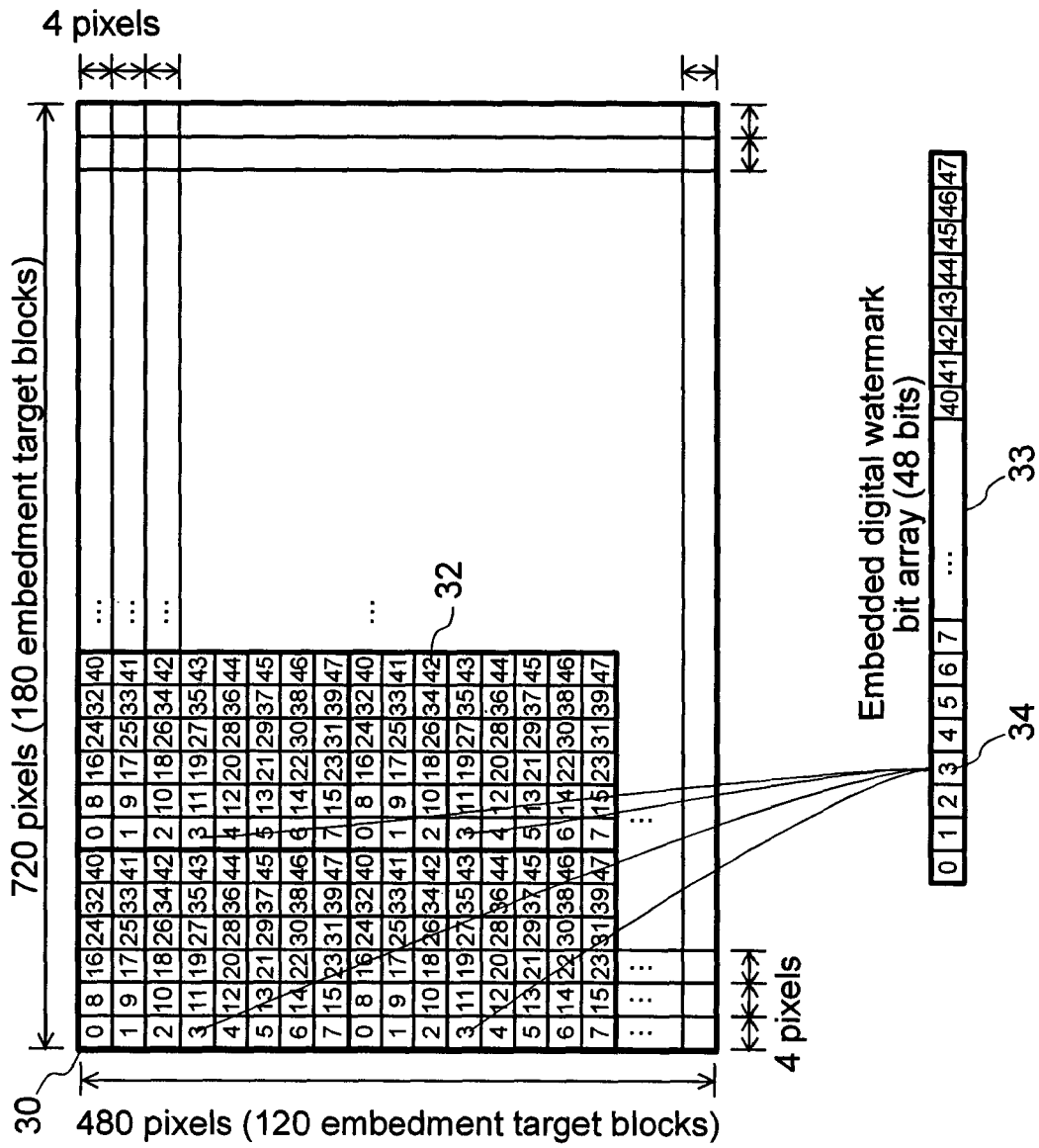
FIG. 8 is an explanatory diagram showing an individual static-picture frame of a moving picture and the picture frame blocks into which a digital watermark is embedded.

A frame 30 is divided into portions having a certain size. Each of the portions has a typical size of 4 pixels in width×4 pixels in height. Each of the portions is referred to an embedment block 32. In the example shown in FIG. 8, the frame 30 comprises 216,090 (=720×480/4/4) embedment blocks 32. Each embedded digital watermark bit 34 is associated with a plurality of embedment blocks 32. The association is not necessarily uniform. However, the association needs to be determined. In this embodiment, the association is uniform as shown in FIG. 8. To put it concretely, each embedded digital watermark bit 34 is associated with 450 (=216,090/48) embedment blocks 32. A digital watermark is embedded into the frame 30 as follows. An embedded digital watermark bit 34 of "0" indicates that the luminance of each pixel in each embedment block 32 associated with the embedded digital watermark bit 34 is reduced to make the embedment block 32 darker. On the other hand, an embedded digital watermark bit 34 of "1" indicates that the luminance of each pixel in each embedment block 32 associated with the embedded digital watermark bit 34 is increased to make the embedment block 32 brighter. The number of embedded digital watermark bits can also be smaller or greater than 48. The quantity by which the luminance is reduced or increased is determined by the pixel-change quantity 2310. If the value of a pixel is a digital quantity such as an integer having 256 values from 0 to 255, typically, an integer obtained as a result of an operation to round the pixel-change quantity 2310 is used. The pixel-change quantity 2310 is rounded by rounding-up or rounding-down (truncation) in a random manner. The fraction part of the pixel-change quantity 2310 can be used as a rounding-up probability.

Figure 5:
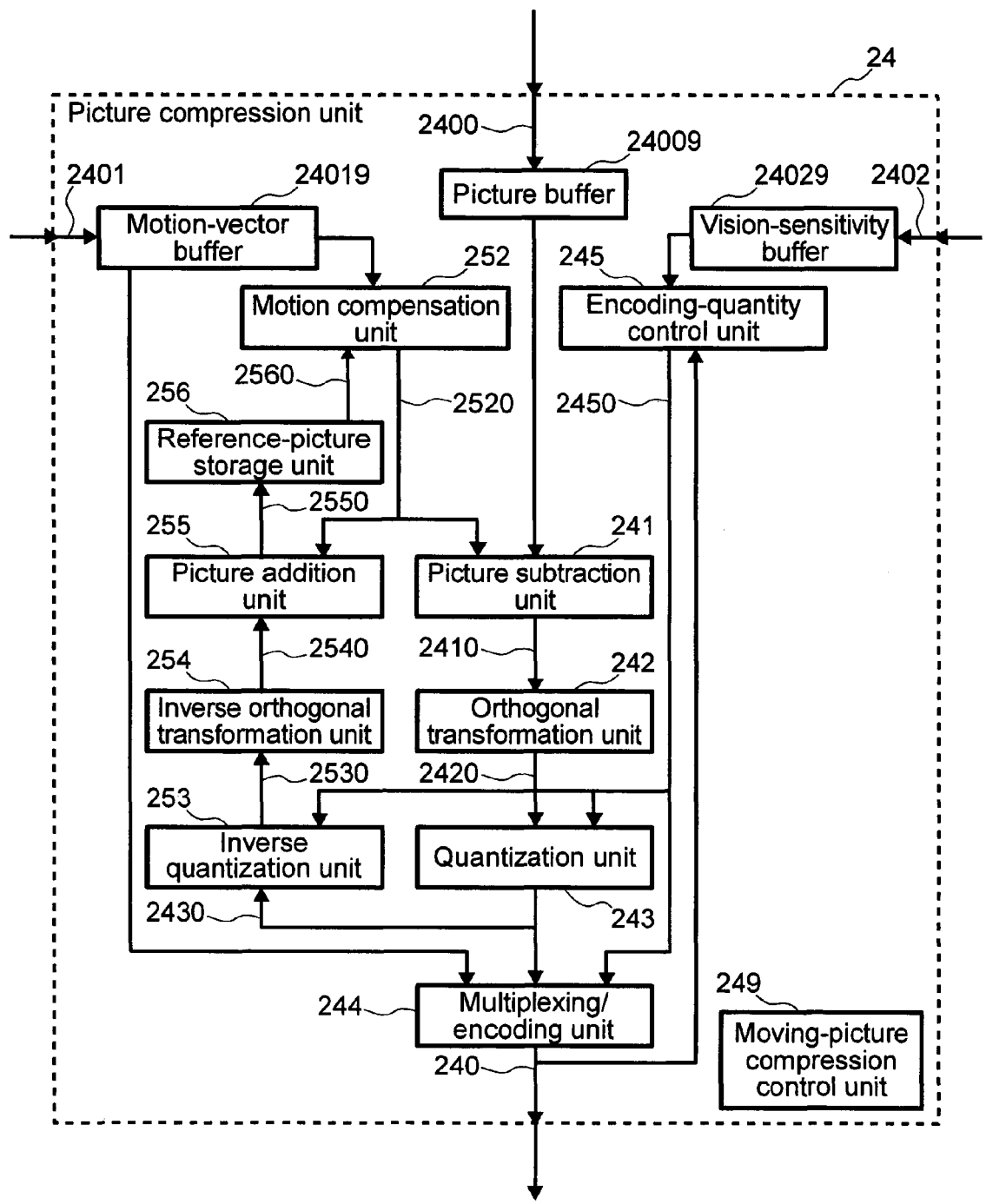
FIG. 5 is an explanatory diagram showing the configuration of the moving-picture compression unit employed in the system.

The configuration of the picture compression unit 24 is shown in FIG. 5. In the picture compression unit 24, the embedded-digital-watermark-containing frame 230, the motion-searching vector 210 and the noise-vision-sensitivity index 220 are received as respectively a compression-object picture frame 2400, a compression motion vector 2401 and a compression noise-vision-sensitivity index 2402, which are also shown in FIG. 5. A motion compensation unit 252 generates a compensated-motion picture 2520 from a reference picture 2560 read out from a reference-picture storage unit 256 and the compression motion vector 2401 read out from a motion-vector buffer 24019. To put it in detail, the motion compensation unit 252 generates the picture of a motion-inference block 38 indicated by the compression motion vector 2401 for each compression block 31 shown in FIG. 7 by using the reference picture 2560 as the reference frame 36 shown in FIG. 9, and then outputs the picture of the motion-inference block 38 as the compensated-motion picture 2520 to a picture subtraction unit 241 and a picture-addition unit 255. For each compression block 31, the picture subtraction unit 241 subtracts the values of pixels on the compensated-motion picture 2520 from the values of the corresponding pixels on the compression-object picture frame 2400 read out from a picture buffer 24009 in order to generate a compressed differential picture 2410. An orthogonal conversion unit 242 carries out an orthogonal transformation process such as a DCT (Discrete Cosine Transform) process on the compressed differential picture 2410, and outputs compressed orthogonal transformation data 2420 as a result of the orthogonal transformation process to a quantization unit 243. The quantization unit 243 carries out a quantization process on the compressed orthogonal transformation data 2420 at a quantization step, which is determined on the basis of a compression control quantization scale parameter 2450, and outputs compressed quantized data 2430 as a result of the quantization process to a multiplexing/encoding unit 244 and an inverse-quantization unit 253. The inverse-quantization unit 253 carries out an inverse-quantization process on the compressed quantized data 2430 at a quantization step, which is determined on the basis of the compression control quantization scale parameter 2450 in the same way as the quantization unit 243, and outputs decoded orthogonal transformation data 2530 as a result of the inverse-quantization process to an inverse orthogonal transformation unit 254. The inverse orthogonal transformation unit 254 carries out an inverse orthogonal transformation process, which is an inversed process of the orthogonal transformation process carried out by the orthogonal transformation unit 242, and outputs a decoded differential picture 2540 as a result of the inverse orthogonal transformation process to the picture addition unit 255. The picture addition unit 255 adds the values of pixels on the decoded differential picture 2540 to the values of the corresponding pixels on the compensated-motion picture 2520, and outputs a reference decoded picture frame 2550 as a result of addition to the reference-picture storage unit 256. In the reference-picture storage unit 256, the reference decoded picture frame 2550 is stored as a reference frame for the next frame. By using the compression motion vector 2401 read out from the motion-vector buffer 24019 and the compression control quantization scale parameter 2450, the multiplexing/encoding unit 244 carries out multiplexing and encoding processes on the compressed quantized data 2430, and generates output picture compressed data 240 as a result of the multiplexing and encoding processes.

An encoding-quantity control unit 245 measures the amount of the output picture compressed data 240 and computes the compression control quantization scale parameter 2450 as an output on the basis a specified bit rate and the compression noise-vision-sensitivity index 2402 read out from a vision-sensitivity buffer 24029.

The compression control quantization scale parameter 2450 is computed by using typically Eq. (4) given below.

$$Q' = NS \cdot \left\{ 1 + \frac{B_{output} - B_{target}}{r \cdot B_{rate}} \right\} \quad (4)$$

$$Q = \begin{cases} 1 & (Q' < 1) \\ Q' & (1 \le Q' \le 31) \\ 31 & (31 < Q') \end{cases}$$

where
NS: Noise vision sensitivity index
$B_{rate}$: Bit rate (Number of bits per frame)
$B_{target}$: Target number of generated bits
$B_{output}$: Number of output bits
r=2: Feedback constant
Q': Computed intermediate value of the quantization scale parameter
Q: Quantization scale parameter In this case, the target number of generated bits is a number of generated bits, which is set by assuming that bits are to be generated uniformly for all compression blocks 31. If the feedback constant is decreased, the eyes of a human being become sensitive to an increase and a decrease in generated-bit count. If the feedback constant is raised, on the other hand, the eyes of a human being become insensitive to an increase and a decrease in generated-bit count. A technique to control the bit rate is disclosed in documents including "General Multimedia Selected Article MPEG," The Institute of Image Information and Television Engineers, pp. 110-115, published by Ohmsha, Ltd., 1996.

For a large compression control scale parameter 2450, the quantization step used in the quantization unit 243 also increases, raising the number of distortions (or noises) in the picture but reducing the amount of the output picture compressed data 240 generated in the multiplexing/encoding unit 244. Conversely speaking, for a small compression control scale parameter 2450, the quantization step used in the quantization unit 243 also decreases, reducing the number of distortions (or noises) in the picture and improving the quality of the picture but increasing the amount of the output picture compressed data 240 generated in the multiplexing/encoding unit 244. The encoding-quantity control unit 245 increases the compression control scale parameter 2450 for a large amount of the output picture compressed data 240 in comparison with a specified bit rate. For a small large amount of the output picture compressed data 240 in comparison with a specified bit rate, on the other hand, the encoding-quantity control unit 245 decreases the compression control scale parameter 2450. In addition, the encoding-quantity control unit 245 decreases the compression control scale parameter 2450 for a compression block 31 with a small compression noise-vision-sensitivity index 2402 in order to improve the quality of the picture. For a compression block 31 with a large compression noise-vision-sensitivity index 2402, on the other hand, the encoding-quantity control unit 245 increases the compression control scale parameter 2450, reducing the number of output bits.

The following description explains control operations related to a compression factor, which indicates the number of bits generated by a compression process. In general, a high compression factor is applied to an uncomplicated portion of a picture. Such a portion is compressed at a high compression factor to produce a small number of bits obtained as a result of the compression process in comparison with a complicated portion of the picture. It is to be noted that, since an uncomplicated portion of the picture needs to have a high picture quality, a small quantization parameter is used. Since this portion can be compressed with a high degree of efficiency, however, the number of generated bits is small even if a small quantization parameter is used.

On the other hand, a small compression factor is applied to a complicated portion of the picture to give a large number of bits obtained as a result of the compression process. Thus, in order to prevent the number of bits obtained as a result of the compression process from becoming excessively large, the quantization parameter is increased. At that time, since the noise vision sensitivity of a human being is relatively low for a complicated portion of the picture, however, deteriorations in picture quality are not conspicuous even if the quantization parameter is increased.

A moving-picture-compression control unit 249 controls all operation timings of the picture compression unit 24. The picture buffer 24009, the motion-vector buffer 24019 and the vision-sensitivity buffer 24029 each serve as a management queue for storing input data till a functional unit requiring the data makes a request for the data so as to adjust operation timings of the functional unit. For example, the picture buffer 24009, the motion-vector buffer 24019 and the vision-sensitivity buffer 24029 are controlled so that predetermined data is held in the picture buffer 24009, the motion-vector buffer 24019 or the vision-sensitivity buffer 24029 till the data stored in the picture buffer 24009, the motion-vector buffer 24019 or the vision-sensitivity buffer 24029 is required by a functional unit. When the predetermined data stored in the picture buffer 24009, the motion-vector buffer 24019 or the vision-sensitivity buffer 24029 is required by a functional unit, the predetermined data is output from the picture buffer 24009, the motion-vector buffer 24019 or the vision-sensitivity buffer 24029 to the functional unit. In this case, a latency delay time, which has the same length as the time required for carrying out a process to embed a digital watermark into a portion for containing the embedded digital watermark, is naturally introduced into data stored in the picture buffer 24009 in comparison with the motion vector stored in the motion-vector buffer 14019 and the noise-vision-sensitivity index stored in the noise-vision-sensitivity buffer 24019. For this reason, it is necessary to hold the motion vector and the noise-vision-sensitivity index in the motion-vector buffer 24019 and the vision-sensitivity buffer 24029 respectively during the latency delay time. In addition, the following technique can be adopted as another method of controlling timings. The motion compensation unit 252 computes a motion-compensation quantity when a compression motion vector 2401 of a predetermined compression block and the picture data of a predetermined reference frame are both available in the motion-vector buffer 24019 and the reference-picture storage unit 256 respectively. The picture subtraction unit 241 carries out a process to generate a compressed differential picture 2410 when the picture of the predetermined compression block is available in the picture buffer 24009 and a compensated-motion picture 2520 is output by the motion compensation unit 252. The multiplexing/encoding unit 244 carries out multiplexing and encoding processes when a compression motion vector 2401 for a predetermined compression block is available in the motion-vector buffer 24019 whereas compressed quantized data 2430 and a compression control quantization scale parameter 2450 are output by the quantization unit 243 and the encoding-quantity control unit 245 respectively. The encoding-quantity control unit 245 computes a compression control quantization scale parameter 2450 when a compression noise-vision-sensitivity index 2402 for a predetermined compression block is available in the vision-sensitivity buffer 24029 and computation of an amount of predetermined output picture compressed data 240 is completed by the multiplexing/encoding unit 244. A compression motion vector 2401 is held in the motion-vector buffer 24019 till both the multiplexing/encoding unit 244 and the motion compensation unit 252 have used the compression motion vector 2401.

As described above, the motion-searching vector 210 and the noise-vision-sensitivity index 220 are shared by the digital-watermark embedment unit 23 and the picture compression unit 24 so as to substantially reduce the processing cost.

In addition, a picture-digital-watermark-embedding compression circuit 17 enclosed by a dashed line in the configuration shown in FIG. 1 can be obtained by integration to embed only the digital-watermark embedment unit 23 included in the same configuration into an existing picture compression integrated circuit so that only a relatively small circuit area is required for implementing a function to embed a digital watermark into a picture. This is because the configuration's portions other than the digital-watermark embedment unit 23 are already included in the existing picture compression integrated circuit. In addition, the digital-watermark embedment unit 23 incurs only a relatively low processing cost as described above.

Figure 2:
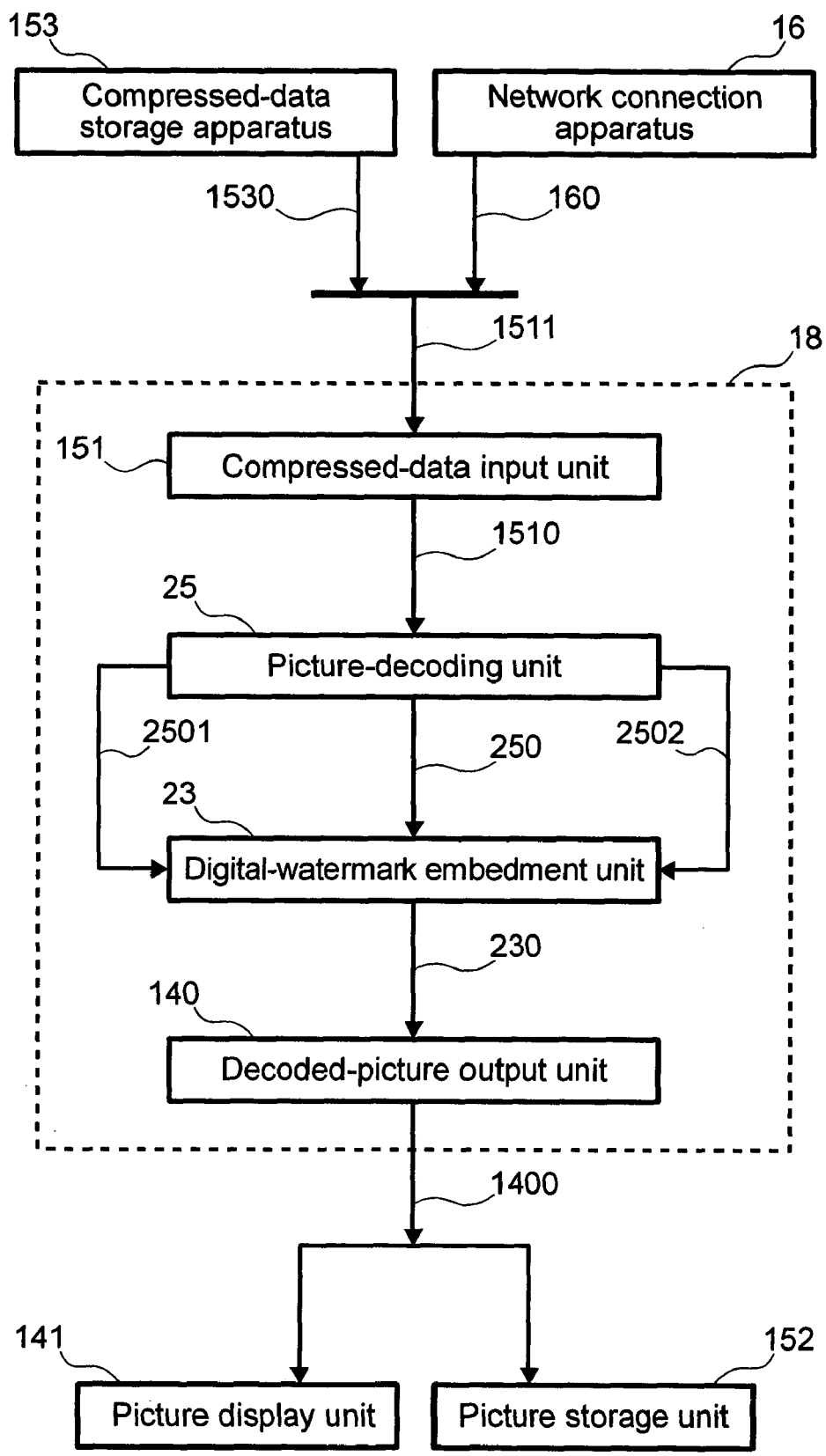
FIG. 2 is an explanatory diagram showing the configuration of a system applying a combination of a moving-picture-decoding unit and the digital-watermark embedment unit.

Next, a second embodiment is explained by referring to FIG. 2. FIG. 2 is an explanatory diagram showing the configuration of a system in which a compressed and encoded moving picture is subjected to a decoding process and, then, a digital watermark is embedded into a moving picture obtained as a result of the decoding process by using a quantization parameter and a motion vector, which are each obtained from the decoding process as well, before the moving picture including a digital watermark is displayed.

The compressed and encoded moving-picture content is a content stored in a compressed-data storage apparatus 153 or a content received from a network connected to a network connection apparatus 16. Recorded compressed and encoded data 1530 stored in the compressed-data storage apparatus 153 or streaming input data 160 received from the network connection apparatus 16 is supplied to a compressed-data input unit 151 as input compressed and encoded data 1511. The compressed and encoded data 1511 is kept in a buffer employed in the compressed-data input unit 151 temporarily till a picture-decoding unit 25 makes a request for the input compressed and encoded data 1511. As such a request is made by the picture-decoding unit 25, the input compressed and encoded data 1511 is supplied to the picture-decoding unit 25 as input-picture compressed and encoded data 1510. The picture-decoding unit 25 decodes the input-picture compressed and encoded data 1510, outputting a decoded-picture frame 250, a decoded motion vector 2501 and a decoded quantization scale parameter 2502 to a digital-watermark embedment unit 23. The digital-watermark embedment unit 23 embeds a digital watermark into the decoded-picture frame 250 by using the decoded motion vector 2501 and the decoded quantization scale parameter 2502, outputting an embedded-digital-watermark-including frame 230 to a decoded-picture output unit 140. The embedded-digital-watermark-containing frame 230 is kept in a buffer employed in the decoded-picture output unit 140 temporarily before being output to a picture display apparatus 141 or a picture storage apparatus 152 as decoded-picture output data 1400 representing a continuously moving picture. The picture display apparatus 141 displays the received decoded-picture output data 1400 as a visible moving picture. On the other hand, the picture storage apparatus 152 is used for storing the received decoded-picture output data 1400.

The following description explains detailed operations carried out by functional units employed in the system shown in FIG. 2.

Figure 6:
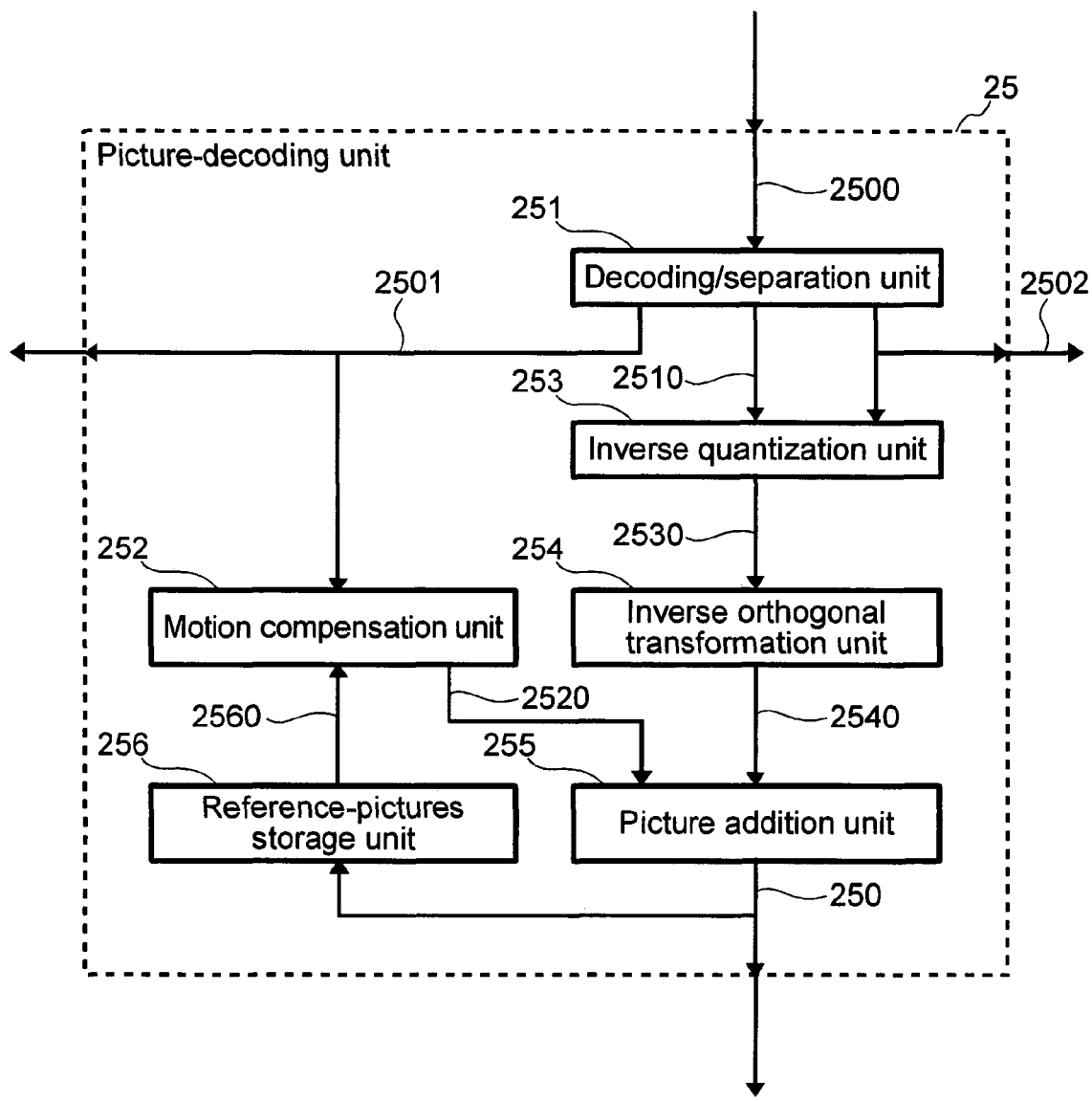
FIG. 6 is an explanatory diagram showing the configuration of the moving-picture compression unit employed in the system.

The configuration of the picture-decoding unit 25 is shown in FIG. 6. The picture-decoding unit 25 receives the input-picture compressed and encoded data 1510 as decoding-object compressed data 2500. The decoding-object compressed data 2500 is subjected to an entropy decoding process in a decoding/separation unit 251, which outputs a multiplexed motion vector, quantized data and a quantization scale parameter as a decoded motion vector 2501, decoded quantized data 2510 and a decoded quantization scale parameter 2502 respectively. The decoded quantization scale parameter 2502 is supplied to a motion compensation unit 252 whereas the decoding quantized data 2510 and the decoding quantization scale parameter 2502 are supplied to an inverse-quantization unit 253. In addition, the decoded motion vector 2501 and the decoding quantization scale parameter 2502 are supplied to the digital-watermark embedment unit 23 shown in FIG. 2.

In the case of a picture having no motion vector as is the case with an I picture according to an MPEG-2 technique, however, a zero vector is output as the decoded motion vector 2501. In this case, the picture addition unit 255 outputs decoded differential picture 2540 without changes as a decoded picture frame 250. In addition, in the case of a frame including only some compression blocks 31 having no motion vector as is the case with intra-blocks in a P picture according to the MPEG-2 technique, the output decoded motion vector 2501 has a sufficient magnitude. In this case, the picture addition unit 255 also outputs decoded differential picture 2540 without changes as a decoded picture frame 250. That is to say, a whole MPEG-2 I picture is treated like a static picture while some intra-blocks in an MPEG-2 P picture are handled as a moving picture.

The digital-watermark embedment unit 23 employed in the system shown in FIG. 2 has a configuration shown in FIG. 4 explained earlier. The digital-watermark embedment unit 23 carries out the same processing as that employed in the first embodiment to embed a digital watermark. However, the decoded picture frame 250, the decoded motion vector 2501 and the decoded quantization scale parameter 2502, which are shown in FIG. 2, are received respectively as an embedding-target picture frame 2300, an embedment motion vector 2301 and an embedment noise-vision-sensitivity index 2302 by the digital-watermark embedment unit 23 shown in FIG. 4. The decoded quantization scale parameter 2502 is related to a human being's vision sensitivity to a noise. To put it in detail, for a picture's portion to which the noise vision sensitivity of a human being is high, the decoded quantization scale parameter 2502 is relatively small. For a picture's portion to which the noise vision sensitivity of a human being is low, on the other hand, the decoded quantization scale parameter 2502 is relatively large. For this reason, the decoded quantization scale parameter 2502 can be utilized as an index of the noise vision sensitivity in place of the noise-vision-sensitivity index 220 used in the system shown in FIG. 1.

As described above, the configuration shown in FIG. 2 does not include the motion-searching unit 21 and the vision-sensitivity computation unit 22, which are employed in the system shown in FIG. 1, but is yet capable of carrying out the same process of embedding a digital watermark into a picture as the system employing the motion-searching unit 21 and the vision-sensitivity computation unit 22. As a result, the processing cost can be reduced substantially. In addition, much like the first embodiment, a picture-digital-watermark-embedding compression circuit 18 enclosed by a dashed line in the configuration shown in FIG. 2 can be obtained by integration to embed only digital-watermark embedment unit 23 included in the same configuration into an existing picture compression integrated circuit.

This is because the configuration's portions other than the digital-watermark embedment unit 23 are already included in the existing picture compression integrated circuit. In addition, the digital-watermark embedment unit 23 incurs only a relatively low processing cost and occupies only a relatively small circuit area as is the case with the first embodiment.

Figure 3:
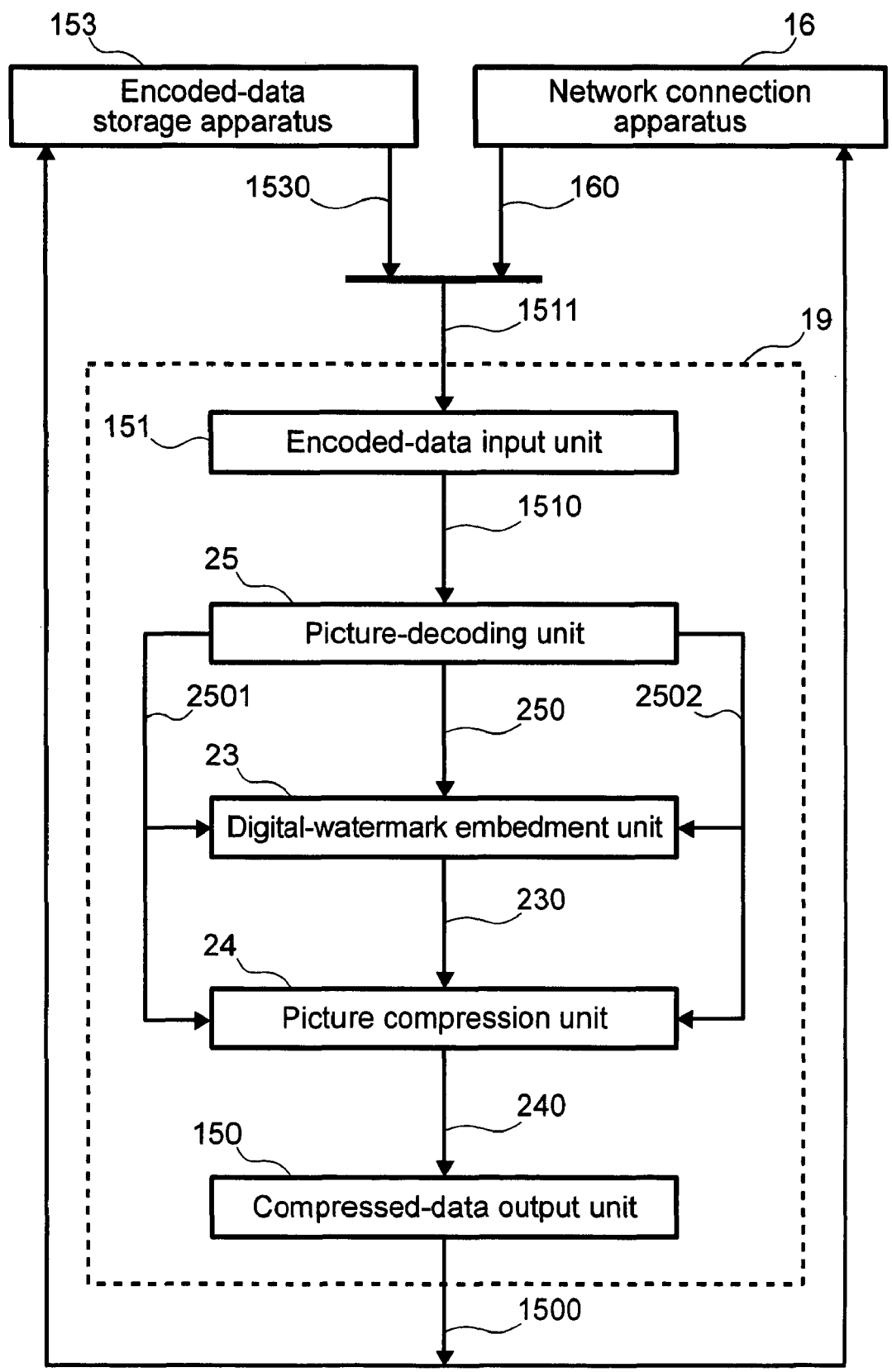
FIG. 3 is an explanatory diagram showing the configuration of a system applying a combination of the moving-picture-decoding unit, the digital-watermark embedment unit and the moving-picture compression unit.

Next, a third embodiment is explained by referring to FIG. 3. FIG. 3 is an explanatory diagram showing the configuration of a system in which an encoded moving picture is subjected in a decoding process to generate a decoded moving picture and, then, a digital watermark is embedded into the decoded moving picture by using a decoded quantization parameter and a decoded motion vector, which are each obtained as a result of the decoding process, before the moving picture including the embedded digital watermark is compressed. The third embodiment is different from the second embodiment in that, after a digital watermark is embedded into the decoded moving picture, the moving picture including the digital watermark is compressed.

The compressed moving-picture content is a content stored in an encoded-data storage apparatus 153 or a content received from a network connected to a network connection apparatus 16. Recorded compressed data 1530 stored in the compressed-data storage apparatus 153 or streaming input data 160 received from the network connection apparatus 16 is supplied to an encoded-data input unit 151 as input compressed data 1511. The input compressed data 1511 is kept in a buffer employed in the encoded-data input unit 151 temporarily till a picture-decoding unit 25 makes a request for the input compressed data 1511. As such a request is made by the picture-decoding unit 25, the input compressed data 1511 is supplied to the picture-decoding unit 25 as input-picture encoded data 1510. The picture-decoding unit 25 decodes the input-picture encoded data 1510, outputting a decoded-picture frame 250, a decoded motion vector 2501 and a decoded quantization scale parameter 2502 to a digital-watermark embedment unit 23. In addition, the decoded motion vector 2501 and the decoded quantization scale parameter 2502 are also supplied to a picture compression unit 24. The digital-watermark embedment unit 23 embeds a digital watermark into the decoded-picture frame 250 by using the decoded motion vector 2501 and the decoded quantization scale parameter 2502, outputting an embedded-digital-watermark-including frame 230 to the picture compression unit 24. The picture compression unit 24 compresses the embedded-digital-watermark-containing frame 230 by using the decoded motion vector 2501 and the decoded quantization scale parameter 2502, outputting output-picture compressed data 240 to a compressed-data output unit 150. The output-picture compressed data 240 is kept in a buffer employed in the compressed-data output unit 150 temporarily, being reshaped into data having a format of a continuous data sequence. The continuous data sequence is then output to a compressed-data storage apparatus 153 or the network connection apparatus 16 as output compressed data 1500. The compressed-data storage apparatus 153 is used for storing the received output compressed data 1500 in a storage medium. On the other hand, the network connection apparatus 16 transmits the output compressed data 1500 to an external apparatus, which is connected by a network to the network connection apparatus 16, by way of the network.

Operations carried out by the picture-decoding unit 25 and the digital-watermark embedment unit 23, which are shown in FIG. 3, are the same as the second embodiment. On the other hand, operations carried out by the picture compression unit 24 shown in FIG. 3 are the same as the first embodiment. However, the picture compression unit 24 receives the embedded-digital-watermark-containing frame 230, the decoded motion vector 2501 and the decoded quantization scale parameter 2502, which are shown in FIG. 3, as respectively a compression-object picture frame 2400, a compression motion vector 2401 and a compression noise-vision-sensitivity index 2402, which are shown in FIG. 5, and carries out a compression process on the compression-object picture frame 2400 by using the compression motion vector 2401 and the compression noise-vision-sensitivity index 2402.

As described above, the configuration shown in FIG. 3 does not include the motion-searching unit 21 and the vision-sensitivity computation unit 22, which are employed in the system shown in FIG. 1, but is yet capable of carrying out the same process of embedding a digital watermark as the system employing the motion-searching unit 21 and the vision-sensitivity computation unit 22. As a result, the processing cost can be reduced substantially. In addition, much like the first embodiments, a picture-digital-watermark-embedding compression circuit 19 enclosed by a dashed line in the configuration shown in FIG. 3 can be obtained by integration to embed only digital-watermark embedment unit 23 included in the same configuration into an existing picture compression integrated circuit. This is because the configuration's portions other than the digital-watermark embedment unit 23 are already included in the existing picture compression integrated circuit. In addition, the digital-watermark embedment unit 23 incurs only a relatively low processing cost and occupies only a relatively small circuit area as is the case with the first and second embodiments.

In addition, assume that the system having the configuration shown in FIG. 2 or 3 receives a content with quantization parameters and/or motion vectors controlled to excessively small or large values. In this case, if the distribution of embedment intensities of the output picture including an embedded digital watermark matches the distribution of the controlled quantization parameters and the distribution of the controlled motion vectors of the input content, it is possible to determine that a technique provided by the embodiments has been adopted in the process of embedding a digital watermark into the picture content.

Next, a fourth embodiment is explained by referring to FIGS. 10 to 16.

Figure 10:
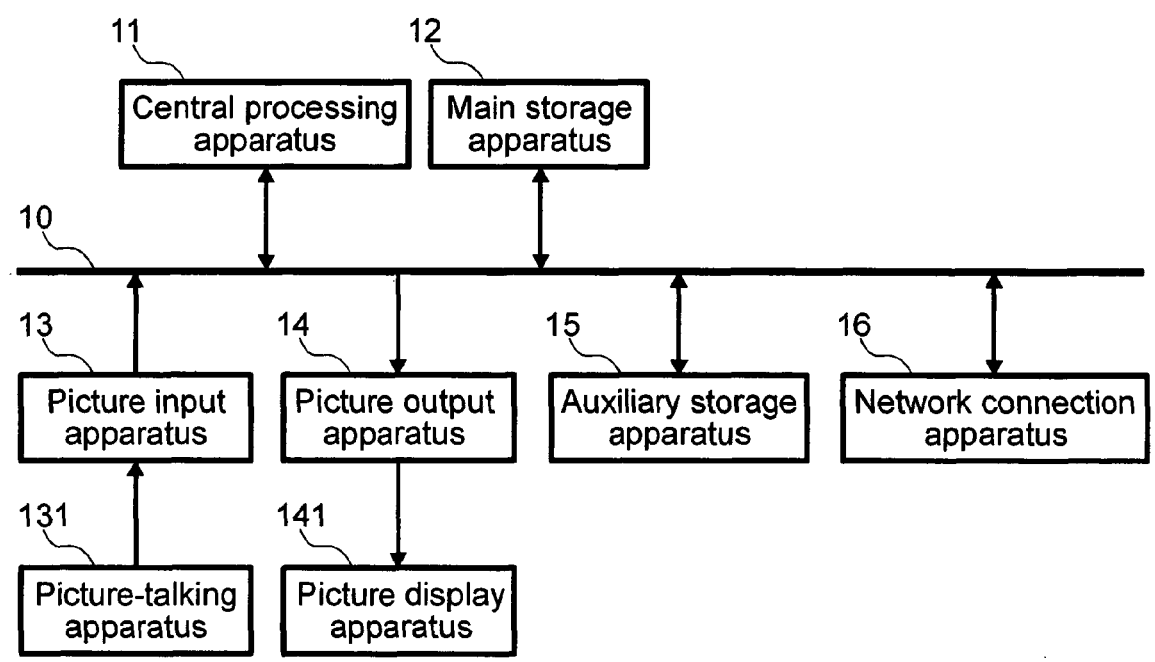
FIG. 10 is an explanatory diagram showing an organization of apparatus each implemented by software.

FIG. 10 is an explanatory diagram showing an organization of hardware for carrying out the processes of first to third embodiments by execution of software. A system bus 10 is used for connecting a central processing apparatus 11, a main storage apparatus 12, a picture input apparatus 13, a picture output apparatus 14, an auxiliary storage apparatus 15 and a network connection apparatus 16 to each other. The picture input apparatus 13 is connected to a picture-taking apparatus 131 and the picture output apparatus 14 is connected to a picture display apparatus 141.

The main storage apparatus 12 is used for storing programs to be executed by the central processing apparatus 11 to carry out data processing, data to be processed, processed data obtained as a result of the data processing and intermediate data. The central processing apparatus 11 executes the programs stored in the main storage apparatus 12 to carry out the data processing. The picture input apparatus 13 receives a moving picture taken by the picture-taking apparatus 131 and stores the moving picture into the main storage apparatus 12. The picture output apparatus 14 reads out a moving picture stored in the main storage apparatus 12 and supplies the moving picture to the picture display apparatus 141. The picture display apparatus 141 displays the moving picture. The network connection apparatus 16 receives data to be processed from a network and outputs the processed data to the system bus 10. The auxiliary storage apparatus 15 is used for storing data to be processed and already processed data.

Figure 11:
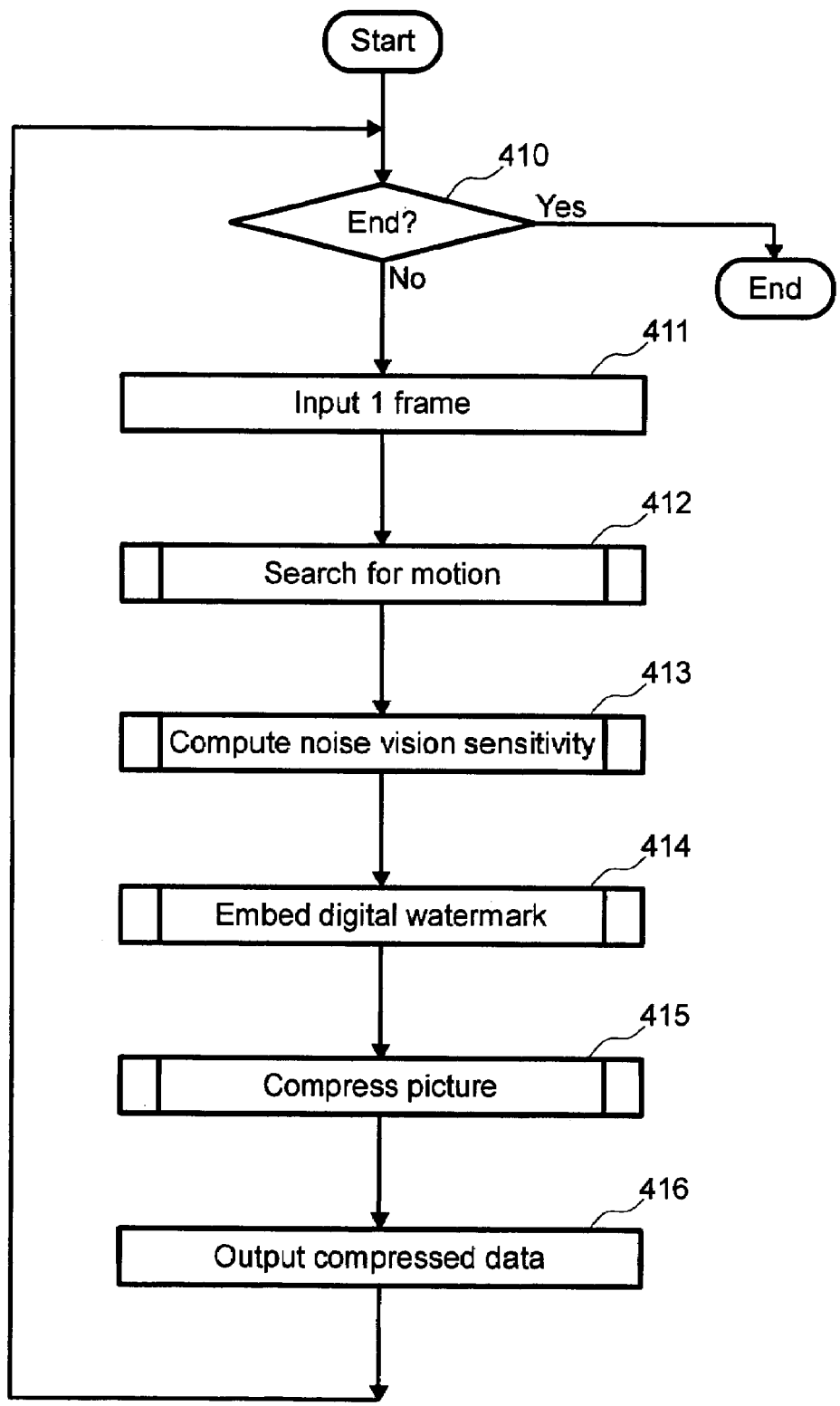
FIG. 11 shows a flowchart representing a process carried out by execution of software comprising functions to embed a digital watermark into a moving picture and compress the moving picture including the embedded digital watermark.

FIG. 11 shows a flowchart representing processing carried out by execution of software to perform the same functions as those of the first embodiment. The flowchart begins with step 410 to form a judgment as to whether or not the entire processing has been completed, that is, a judgment as to whether or not the processing has reached the end of a moving picture being processed. The judgment includes a judgment as to whether or not there is no longer input entered to the picture input apparatus 13 as indicated by an operation to press a stop button of a VTR. The judgment also includes a judgment as to whether or not a process carried out on a predetermined number of frames has been completed. Then, at step 411, a frame is extracted from a moving picture received by the picture input apparatus 13 or from a moving picture stored in the auxiliary storage apparatus 15, and is stored in the main storage apparatus 12 as data to be processed. Subsequently, at step 412, each compression block 31 of the frame is searched for a motion and a result of the search operation is stored in the main storage apparatus 12. The algorithm adopted in the operation to search each compression block 31 of the frame for a motion is the same as the first embodiment. Then, at step 413, a noise vision sensitivity is computed for each compression block 31, and a result of the computation is stored in the main storage apparatus 12. In this case, also the same computation formula as the first embodiment is used. Subsequently, at step 414, a digital watermark is embedded into the frame extracted and stored in the main storage apparatus 12 at step 411 by using the motion vectors found and stored in the main storage apparatus 12 at step 412 as well as the vision sensitivities computed and stored in the main storage apparatus 12 at step 413 to produce a frame including the embedded digital watermark. The frame including the embedded digital watermark is then stored in the main storage apparatus 12. Then, at step 415, the embedded-digital-watermark-including frame stored in the main storage apparatus 12 is compressed and the compressed data is stored in the main storage apparatus 12. Subsequently, at step 416, the compressed data stored in the main storage apparatus 12 is output to the network connection apparatus 16 or the auxiliary storage apparatus 15. By carrying out the pieces of processing at steps 410 to 416 repeatedly for each frame, the digital watermark is embedded into the moving picture and the moving picture including the embedded digital watermark is compressed.

Figure 14:
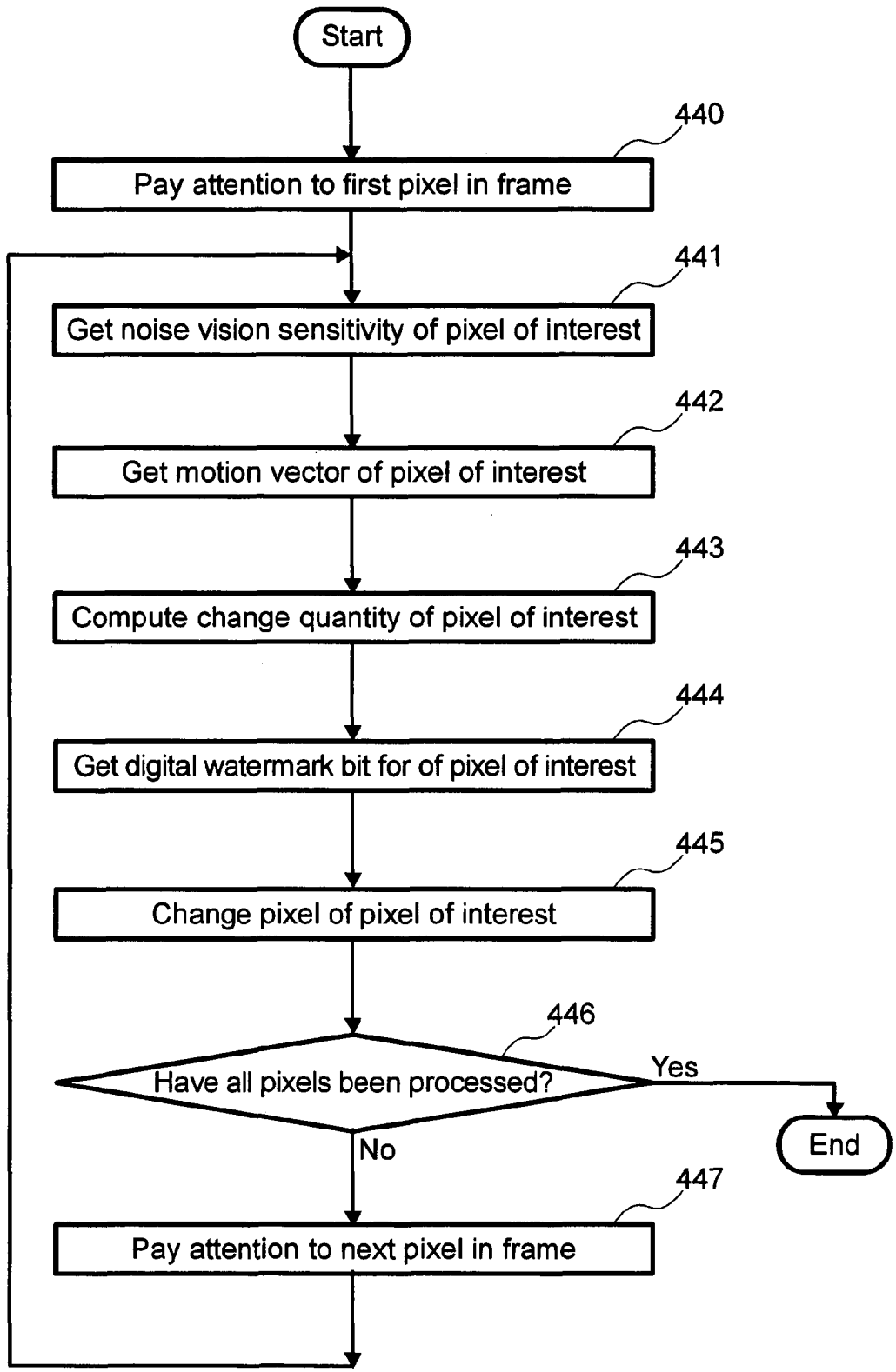
FIG. 14 shows a flowchart representing a process carried out in the system to search for a motion and compute the magnitude of the motion.

FIG. 14 shows a flowchart representing the processing carried out at step 414 of the flowchart shown in FIG. 11 to embed a digital watermark into a frame. The flowchart begins with step 440 at which attention is paid to the first pixel on the frame. Typically, a pixel on the left upper corner of the frame is taken as the first pixel. Then, at step 441, a noise vision sensitivity for the pixel is fetched from the main storage apparatus 12. Subsequently, at step 442, a motion vector for the pixel is fetched from the main storage apparatus 12. Then, at step 443, a change quantity is computed in accordance with Eq. (3). Subsequently, at step 444, an embedded-digital watermark bit 34 for the pixel of interest is selected from the digital watermark-bit array 33. Then, at step 445, the luminance of the pixel is changed by using the change quantity computed at step 443 and the value of the embedded-digital watermark bit 34 selected at step 444. Subsequently, the flow of the processing goes on to step 446 to form a judgment as to whether or not all pixels on the frame have been processed. If not all pixels on the frame have been processed, the flow of the processing goes on to step 447 at which attention is paid to the next pixel. Then, the pieces of processing of steps 441 to 447 are repeated.

Figure 15:
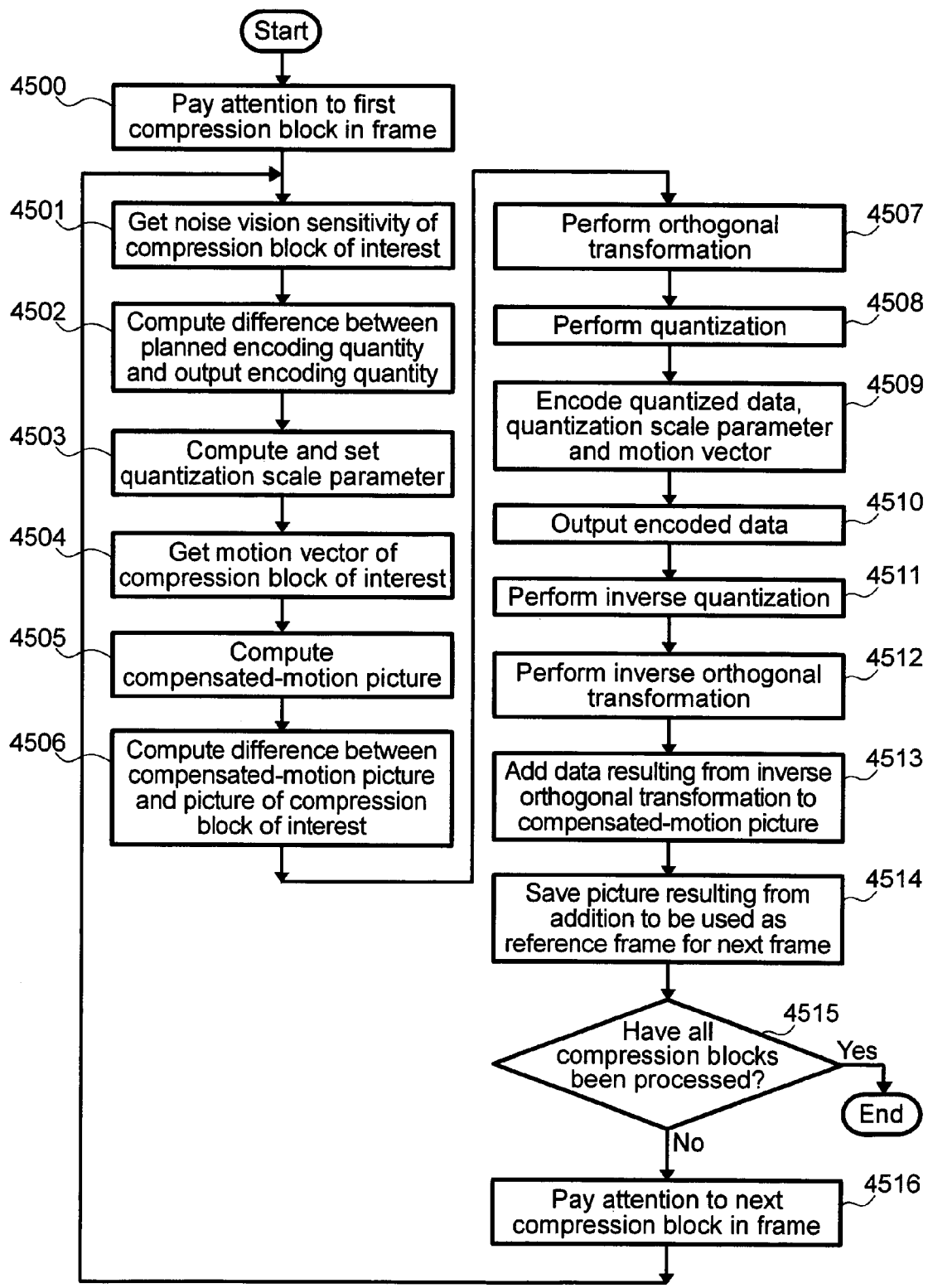
FIG. 15 shows a flowchart representing a process carried out in the system to compress a moving picture.

FIG. 15 shows a flowchart representing the processing carried out at step 415 of the flowchart shown in FIG. 11 to compress a picture including an embedded digital watermark. The flowchart begins with step 4500 at which attention is paid to a compression block 31 on the left upper corner of the frame. Then, at step 4501, a noise vision sensitivity for the compression block 31 of interest is fetched from the main storage apparatus 12. Subsequently, at step 4502, a difference between a planned encoding quantity and an output encoding quantity is computed. Then, at step 4503, a quantization scale parameter is computed in accordance with Eq. (4). Subsequently, at step 4504, a motion vector for the compression block 31 of interest is fetched from the main storage apparatus 12. Then, at step 4505, a compensated-motion picture based on the motion vector is generated. Subsequently, at step 4506, differences in pixel value between the compensated-motion picture generated at step 4505 and the compression block 31 of interest are computed. Then, at step 4507, the differences in pixel value between the pictures, that is, the differences computed at step 4506, are subjected to an orthogonal transformation process. Subsequently, at step 4508, data obtained as a result of the orthogonal transformation process carried out at step 4507 is subjected to a quantization process by using the quantization scale parameter found at step 4503. Then, at step 4509, data obtained as a result of the quantization process carried out at step 4508, the quantization scale parameter found at step 4503 and the motion vector fetched at step 4504 are subjected to entropy-encoding and multiplexing-encoding processes. Subsequently, at step 4510, compressed data obtained as a result of the entropy-encoding and multiplexing-encoding processes is stored in the main storage apparatus 12. Then, at step 4511, the data obtained as a result of the quantization process carried out at step 4508 is subjected to an inverse-quantization process using the quantization scale parameter found at step 4503. Subsequently, at step 4512, data obtained as a result of the inverse-quantization process carried out at step 4511 is subjected to an inverse-orthogonal-transformation process. Then, at step 4513, picture data obtained as a result of the inverse-orthogonal-transformation process carried out at step 4512 is added to the compensated-motion picture obtained at step 4505. Subsequently, at step 4514, a picture obtained as a result of the addition process carried out at step 4513 is stored in the main storage apparatus 12 to be used as a reference frame for the next frame. Then, the flow of the processing goes on to step 4515 to form a judgment as to whether or not all compression blocks 31 on the frame have been processed. If not all compression blocks 31 on the frame have been processed, the flow of the processing goes on to step 4516 at which attention is paid to the next compression block 31. By carrying out the pieces of processing of steps 4501 to 4516 repeatedly for all compression blocks 31 of the frame, the frame can be compressed.

As is obvious from the flowchart shown in FIG. 11 described above, a motion vector found in one search operation and a noise vision sensitivity obtained as a result of one computation process can be used in both the process to embed a digital watermark into a picture and a process to compress the picture including the embedded digital watermark without newly finding a motion vector and a noise vision sensitivity for the process to compress the picture including the embedded digital watermark. Thus, a processing cost can be reduced substantially in comparison with a case in which a motion vector and a noise vision sensitivity are found for the process to embed a digital watermark into the picture in operations separated from operations to find a motion vector and a noise vision sensitivity for the process to compress the picture including the embedded digital watermark.

As a result, the processing speed of the system can be increased whereas the system's size and cost can be reduced.

Figure 12:
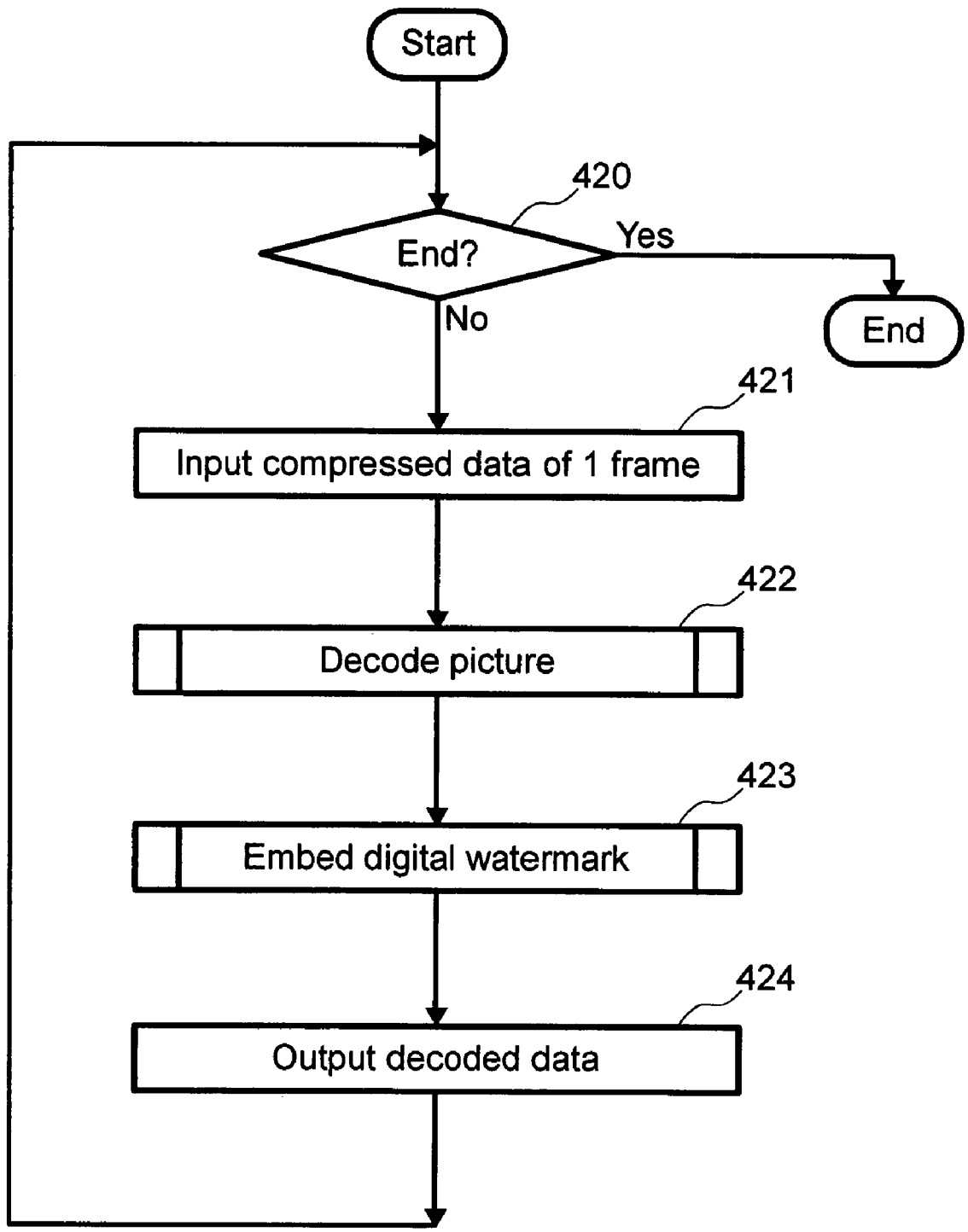
FIG. 12 shows a flowchart representing a process carried out by execution of software comprising functions to decode a moving picture and embed a digital watermark into the decoded moving picture.

FIG. 12 shows a flowchart representing processing carried out by execution of software to perform the same functions as those of the second embodiment. The flowchart begins with step 420 to form a judgment as to whether or not the entire processing has been completed, that is, a judgment as to whether or not the processing has reached the end of compressed data being processed. Then, at step 421, compressed data of a frame is extracted from compressed and encoded data received by the network connection apparatus 16 or from compressed and encoded data stored in the auxiliary storage apparatus 15, and is stored in the main storage apparatus 12. Subsequently, at step 422, the frame's compressed and encoded data stored in the main storage apparatus 12 is decompressed as well as decoded and, then, a decompressed frame picture, a decoded motion vector and a decoded quantization scale parameter, which are each obtained as a result of the decompression process, are stored in the main storage apparatus 12. Then, at step 423, a digital watermark is embedded into the decompressed frame picture stored in the main storage apparatus 12 by using the decoded motion vector and the decoded quantization scale parameter, which are read out from the main storage apparatus 12. A frame picture including the embedded digital watermark is then stored in the main storage apparatus 12. Subsequently, at step 424, the embedded-digital-watermark-including frame picture stored in the main storage apparatus 12 is supplied to the picture output apparatus 14 or the auxiliary storage apparatus 15. By carrying out the pieces of processing at the steps 420 to 424 repeatedly for each frame, the compressed and encoded picture is decompressed as well as decoded, and the digital watermark is embedded into the decompressed picture.

Figure 16:
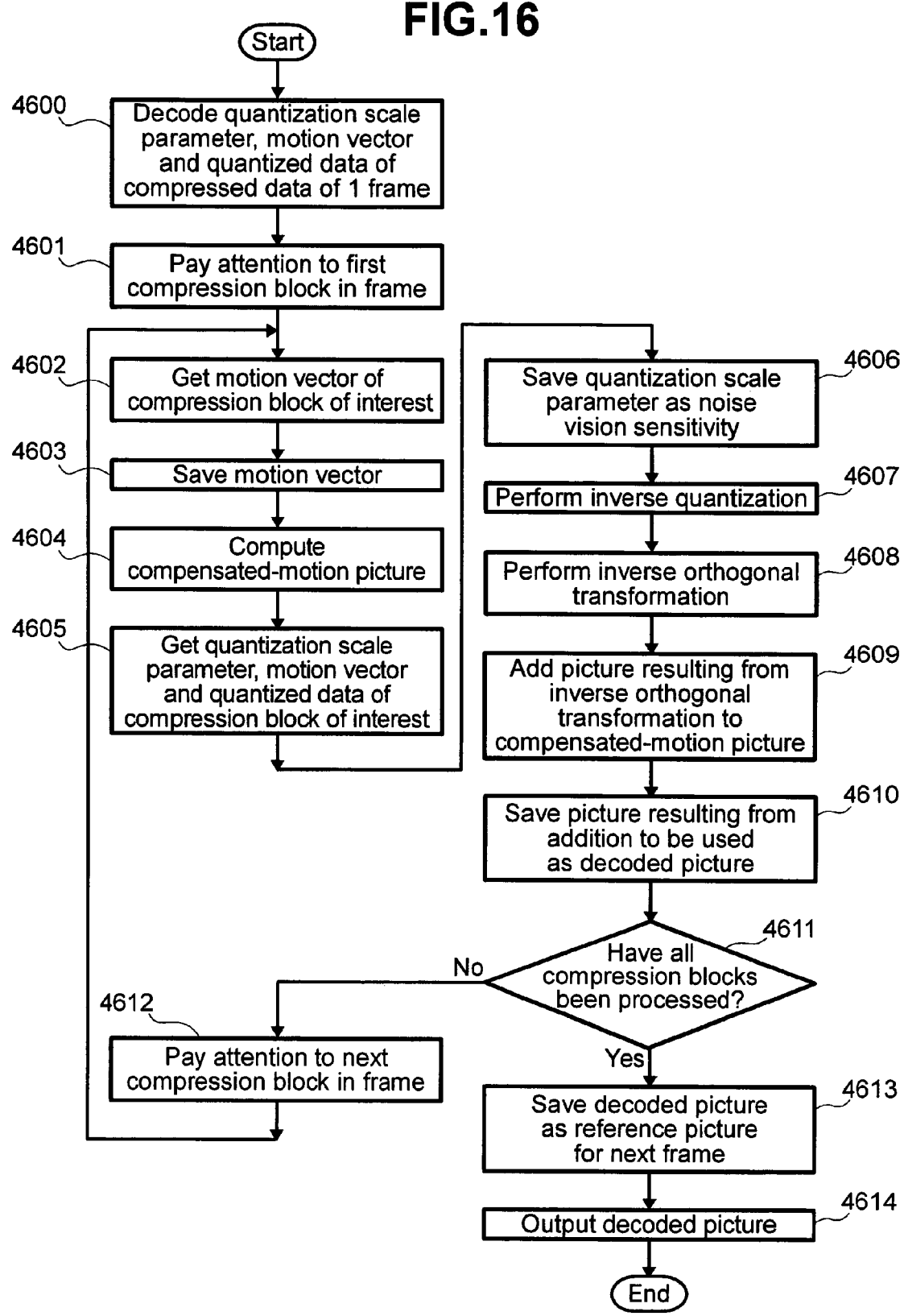
FIG. 16 shows a flowchart representing a process carried out in the system to decode a moving picture.

FIG. 16 shows a flowchart representing the process carried out at step 422 of the flowchart shown in FIG. 12 to decode a picture. The flowchart begins with step 4600 at which compressed and encoded picture data of a frame is subjected to an encoding-separation decoding process and an entropy-encoding decoding process to obtain motion vectors, quantization scale parameters and quantized data, which are then stored in the main storage apparatus 12. Subsequently, at step 4601, attention is paid to a compression block 31 on the left upper corner of the frame. Then, at step 4602, a motion vector for the compression block 31 of interest is selected from the motion vectors obtained at step 4600. Subsequently, at step 4603, the motion vector selected at step 4602 is saved to be used in the process carried out at step 423 of the flowchart shown in FIG. 12 to embed a digital watermark into the picture. Then, at step 4604, a compensated-motion picture is computed by using the motion vector selected at step 4602. Subsequently, at step 4605, a quantization scale parameter for the compression block 31 of interest is selected from the quantization scale parameters obtained at step 4600. Then, at step 4606, the quantization scale parameter selected at step 4605 is saved as a noise-vision-sensitivity index to be used in the process carried out at step 423 of the flowchart shown in FIG. 12 to embed a digital watermark into the picture. Then, at step 4607, the quantized data is subjected to an inverse-quantization process using the quantization scale parameter selected at step 4605. Subsequently, at step 4608, data obtained as a result of the inverse-quantization process carried out at step 4607 is subjected to an inverse-orthogonal-transformation process to produce a decoded differential picture. Then, at step 4609, the decoded differential picture obtained as a result of the inverse-orthogonal-transformation process carried out at step 4608 is added to the compensated-motion picture obtained at step 4604. Subsequently, at next step 4610, a decoded picture obtained as a result of the addition process carried out at step 4609 is stored in the main storage apparatus 12. Then, the flow of the processing goes on to step 4611 to form a judgment as to whether or not all compression blocks 31 on the frame have been processed. If not all compression blocks 31 on the frame have been processed, the flow of the processing goes on to step 4612 at which attention is paid to the next compression block 31. By carrying out the pieces of processing of steps 4602 to 4612 repeatedly for all compression blocks 31 of the frame, the frame can be compressed. If all compression blocks 31 on the frame have been processed, on the other hand, the flow of the processing goes on to step 4613 at which the frame completing the decoding process is saved as a reference picture for the next frame. Subsequently, at step 4614, the frame completing the decoding process is output to the process carried out at the step 423 of the flowchart shown in FIG. 12 to embed a digital watermark into the picture.

The processing carried out at step 423 of the flowchart shown in FIG. 12 is the same as the processing carried out at step 414 of the flowchart shown in FIG. 11. Thus, the processing is carried out at step 423 in accordance with the flowchart shown in FIG. 14. In this case, however, the picture used as a target of the digital-watermark-embedding process is a picture obtained as a result of the decoding process carried out at step 422 of the flowchart shown in FIG. 12. In addition, the motion vectors saved at the step 422 and the quantization scale parameters also saved at the same step are used as motion vectors and quantization scale parameters in the processing carried out at step 423.

As is obvious from the flowchart shown in FIG. 12 described above, a motion vector and a noise vision sensitivity, which are obtained in the process to decode a picture, can be used in the process to embed a digital watermark into the picture without newly finding a motion vector and a noise vision sensitivity for the process to embed a digital watermark into the picture. Thus, a processing cost can be reduced substantially in comparison with a case in which a motion vector and a noise vision sensitivity are found for the process to decode a picture in operations separated from operations to find a motion vector and a noise vision sensitivity for the process to embed a digital watermark into the picture. As a result, the processing speed of the system can be increased whereas the system's size and cost can be reduced.

Figure 13:
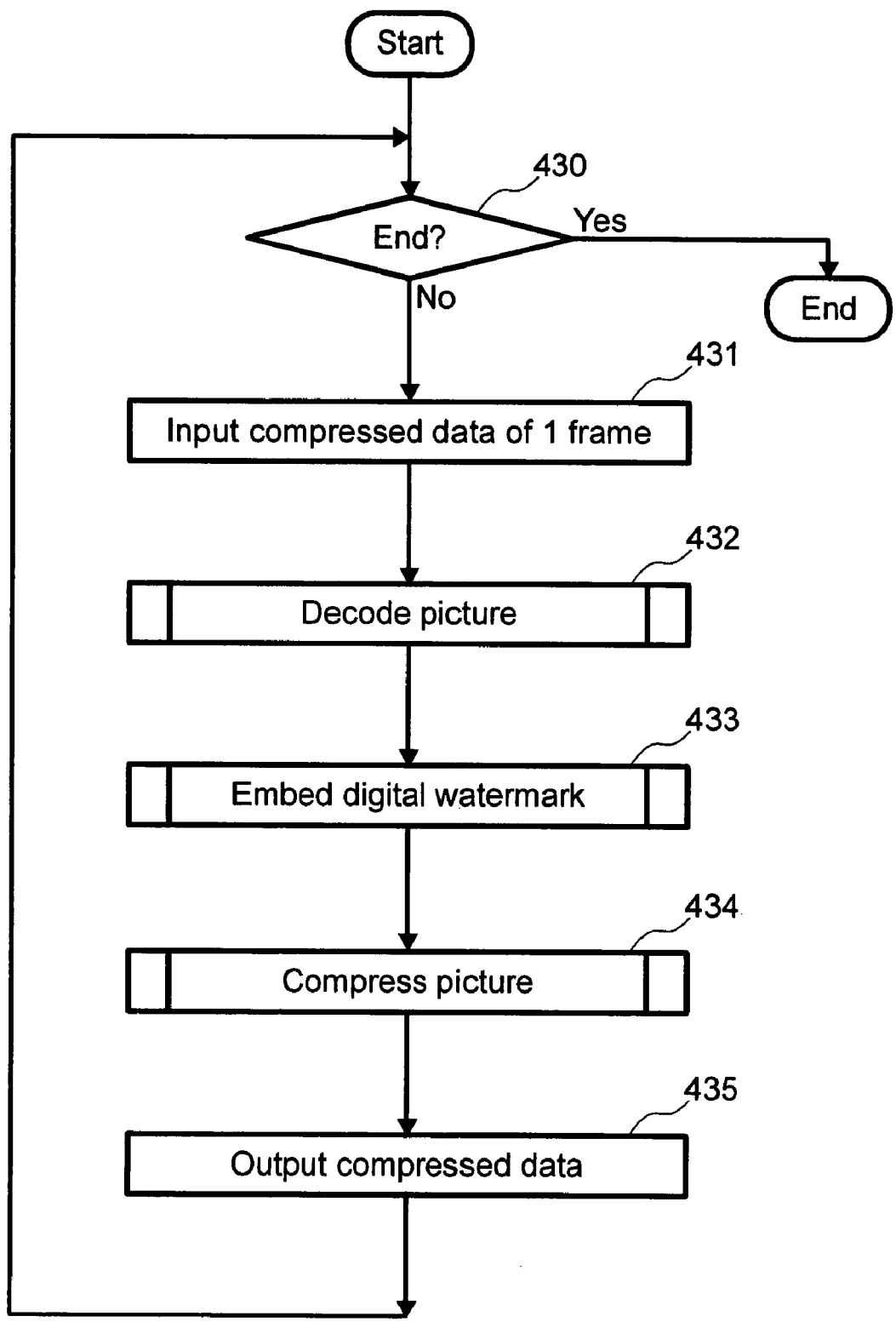
FIG. 13 shows a flowchart representing processing carried out by execution of software comprising functions to decode a moving picture, embed a digital watermark into the decoded moving picture and compress the moving picture including the embedded digital watermark.

FIG. 13 shows a flowchart representing processing carried out by execution of software to perform the same functions as those of the third embodiment. The flowchart begins with step 430 to form a judgment as to whether or not the entire processing has been completed, that is, a judgment as to whether or not the processing has reached the end of compressed data being processed. Then, at step 431, encoded data of a frame is extracted from encoded data received by the network connection apparatus 16 or from encoded data stored in the auxiliary storage apparatus 15, and is stored in the main storage apparatus 12. Subsequently, at step 432, the frame's encoded data stored in the main storage apparatus 12 is subjected to a decoding process and, then, a decoded frame picture, a decoded motion vector and a decoded quantization scale parameter, which are each obtained as a result of the decoding process, are stored in the main storage apparatus 12. Then, at step 433, a digital watermark is embedded into the decoded frame picture stored in the main storage apparatus 12 by using the decoded motion vector and the decoded quantization scale parameter, which are read out from the main storage apparatus 12. A frame picture including the embedded digital watermark is then stored in the main storage apparatus 12. Subsequently, at step 434, the frame picture completing the digital-watermark-embedding process at step 433 is compressed by using the decoded motion vector and the decoded quantization scale parameter, which are obtained at step 432, and is stored in the main storage apparatus 12. Then, at step 435, the embedded-digital-watermark-including frame picture stored in the main storage apparatus 12 is supplied to the network connection apparatus 16 or the auxiliary storage apparatus 15. By carrying out the pieces of processing at steps 430 to 435 repeatedly for each frame, the compressed picture is decoded, the digital watermark is embedded into the decoded picture and the picture including the embedded digital watermark is compressed.

Much like the processing carried out at step 422 of the flowchart shown in FIG. 12, the processing of the step 432 of the flowchart shown in FIG. 13 is carried out in accordance with the flowchart shown in FIG. 16. Much like, the processing carried out at step 423 of the flowchart shown in FIG. 12, the processing of step 433 of the flowchart shown in FIG. 13 is carried out in accordance with the flowchart shown in FIG. 14. Much like the processing carried out at step 415 of the flowchart shown in FIG. 11, the processing of step 434 of the flowchart shown in FIG. 13 is carried out in accordance with the flowchart shown in FIG. 15. In the processing of step 434 of the flowchart shown in FIG. 13, however, the decoded motion vector and the decoded quantization scale parameter, which are saved in the decoding process carried out at step 432, are used as a motion vector and a quantization scale parameter respectively.

As is obvious from the flowchart shown in FIG. 13 described above, a motion vector and a noise vision sensitivity, which are obtained in the process to decode a picture, can be used in the process to embed a digital watermark into the picture and the process to compress the picture including the embedded digital watermark without newly finding a motion vector and a noise vision sensitivity for the process to compress the picture including the embedded digital watermark. Thus, a processing cost can be reduced substantially in comparison with a case in which a motion vector and a noise vision sensitivity are found for the process to decode a picture in operations separated from operations to find a motion vector and a noise vision sensitivity for the process to embed a digital watermark into the picture and the process to compress the picture including the embedded digital watermark. As a result, the processing speed of the system can be increased whereas the system's size and cost can be reduced.

In the embodiments described above, a moving picture is used as a content. However, the processing control described above can also be applied to a static-picture content. In this case, control is executed to carry out a motion compensation process and a picture subtraction/addition process by eliminating the operation to search the content for a motion vector or by always setting the motion vector at zero. As an alternative, some configuration elements can be eliminated in the case of a static-picture content. In the case of a static-picture content, however, a codec for changing a quantization step in dependence on the position on a picture frame must be used as a codec for compressing the static picture. For example, an MPEG-2 I picture is used as a codec of the static picture.

Figure 17:
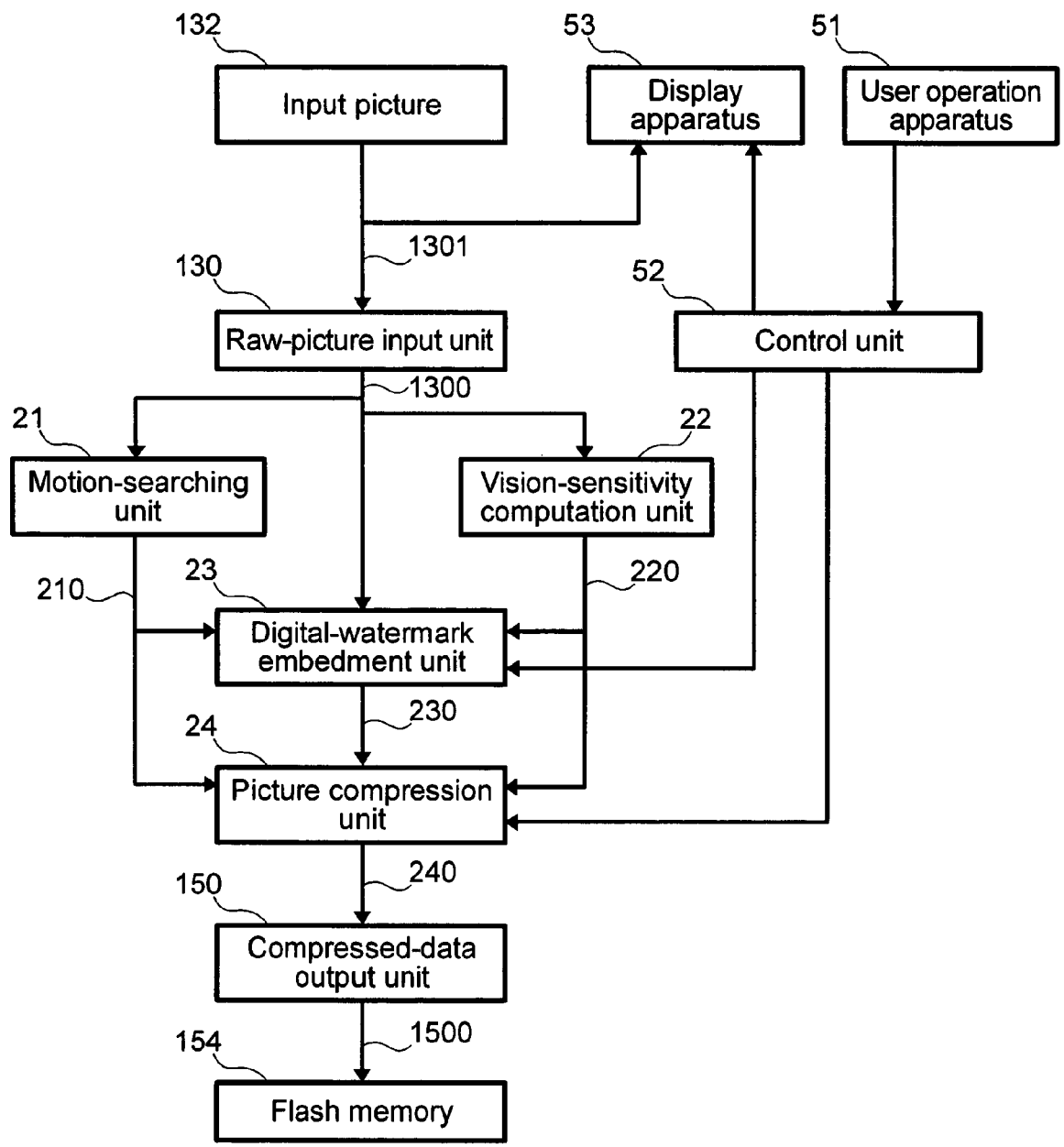
FIG. 17 is a block diagram showing the configuration of an embodiment implementing a digital video camera.

By applying the system for embedding a digital watermark into a picture and compressing the picture including the embedded digital watermark in a configuration shown in FIGS. 1 and 11 to a digital video camera or a digital still camera, it is possible to provide a practical small-sized camera having a function to embed a digital watermark into a picture. In this case, the digital watermark can be used for preventing a content from being falsified. FIG. 17 is a block diagram showing the configuration of an embodiment implementing a digital video camera as an application example. A user operation apparatus 51 includes key switches to be operated by the user to enter a command. The user operates the key switches to enter a command to a control unit 52. The entered command can be a command to start a video recording process, a command to halt the video recording process, a command to set information on embedment of a digital watermark or a command to specify a bit rate of compression to mention a few. A display apparatus 53 displays a picture generated by the camera or information helping the user operate the camera. Output compressed data 1500 is stored in a flash memory 154.

Figure 18:
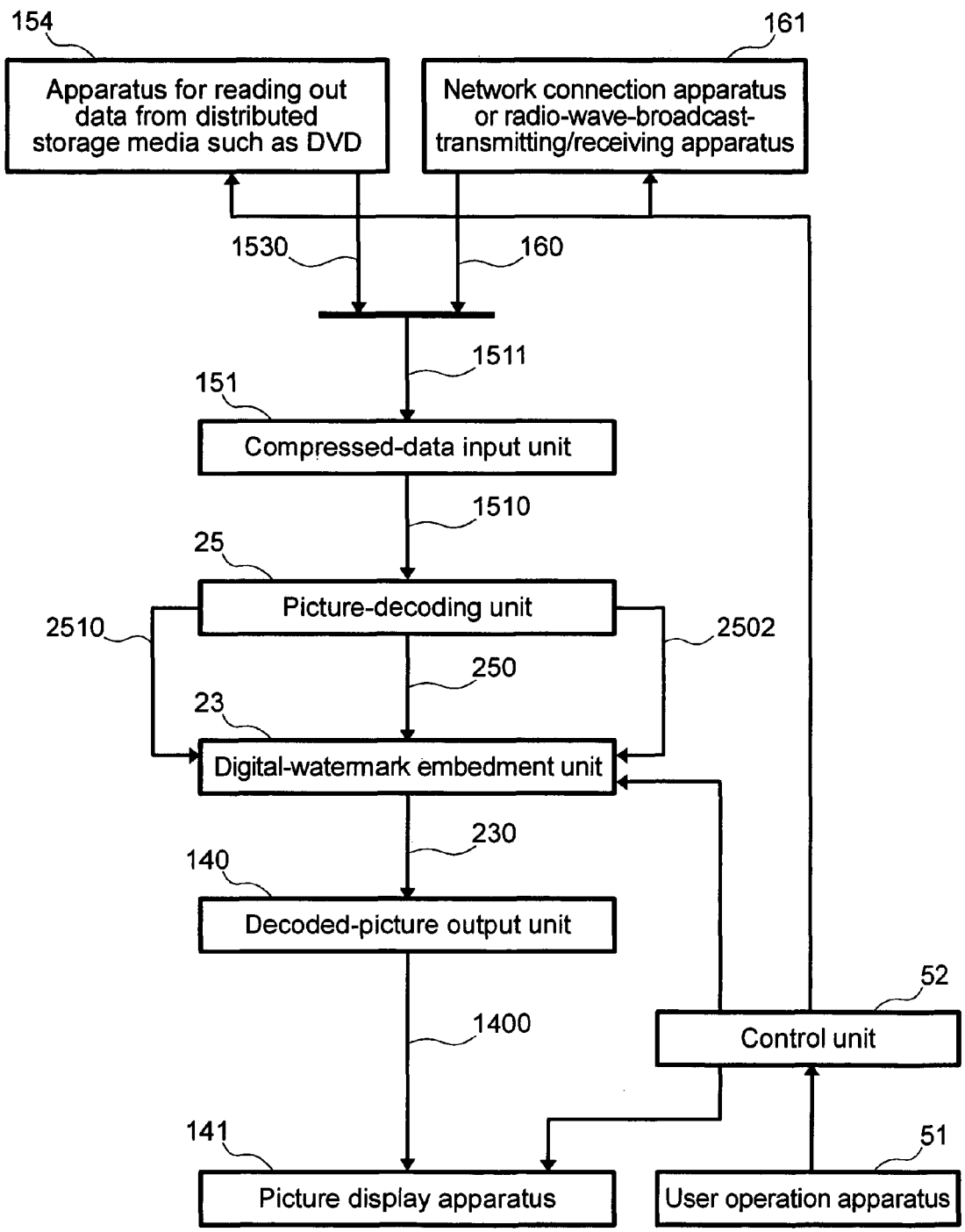
FIG. 18 is a block diagram showing the configuration of an embodiment implementing an inspection apparatus (a set top box of a digital broadcasting system)

By applying the system for embedding a digital watermark into a picture and compressing the picture including the embedded digital watermark in a configuration shown in FIGS. 2 and 12 to a DVD player or a digital television tuner, it is possible to provide a practical small-sized inspection apparatus having a function to embed a digital watermark into a picture. In this case, the digital watermark can be used in applications such as an application to trace an illegal copy of a content. FIG. 18 is a block diagram showing the configuration of an embodiment implementing a DVD player or a digital television tuner as an application example. A user operation apparatus 51 includes key switches to be operated by the user to enter a command. The user operates the key switches to enter a command to a control unit 52. The entered command can be a command to start a reproduction process in the DVD player, a command to halt the video reproduction process, a command to set information on embedment of a digital watermark or a command to change a television channel to mention a few. A picture display apparatus 141 displays a reproduced picture and information helping the user operate the DVD player or the digital television tuner.

Figure 19:
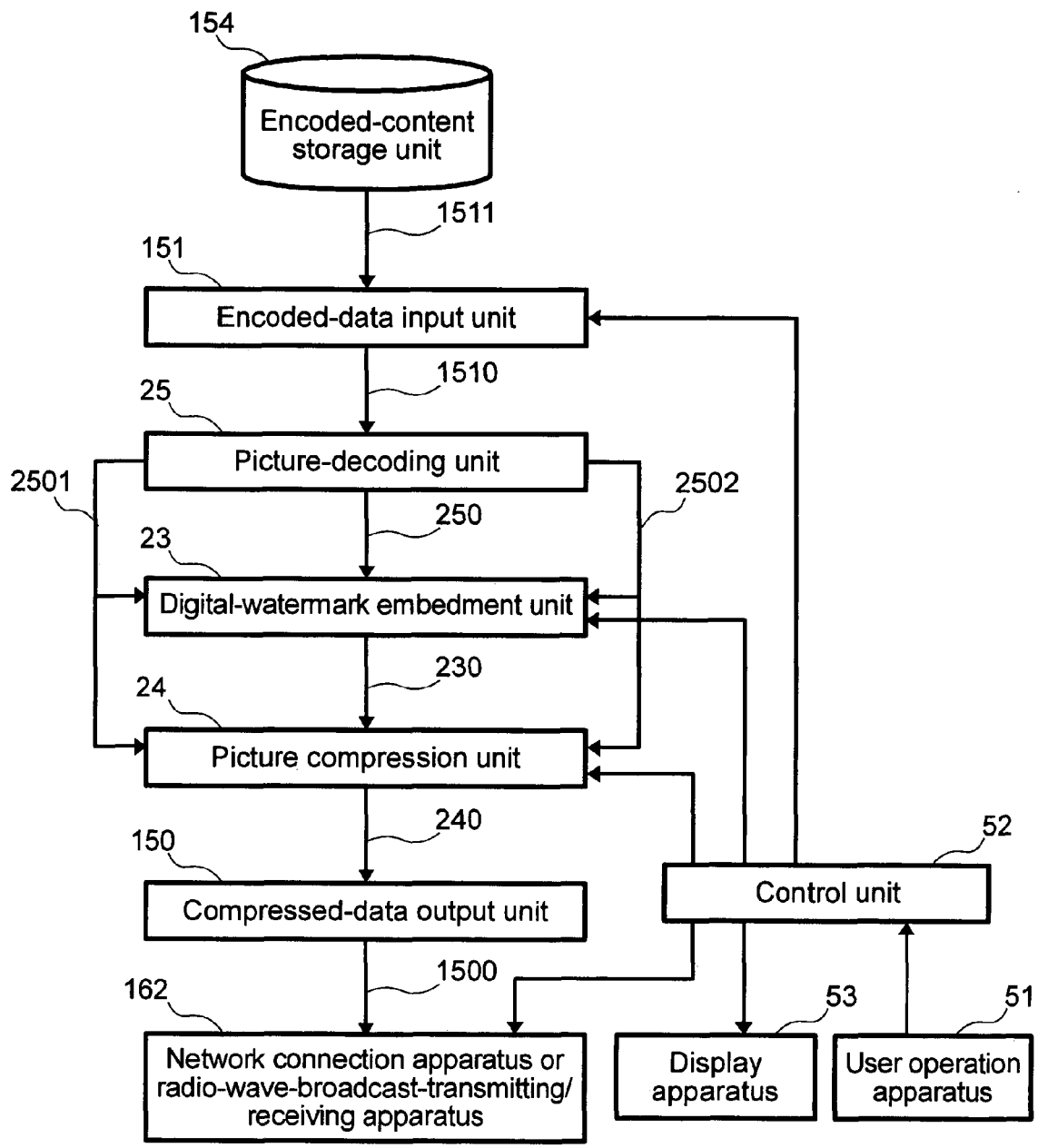
FIG. 19 is a block diagram showing the configuration of an embodiment implementing a broadcasting system.

By applying the system for embedding a digital watermark into a picture and compressing the picture including the embedded digital watermark in a configuration shown in FIGS. 3 and 13 to a video distribution server, it is possible to provide a practical video distribution server capable of changing a digital watermark from distribution to distribution. In this case, the digital watermark can be used for limiting inspections. FIG. 19 is a block diagram showing the configuration of an embodiment implementing a broadcasting system as an application example. A user operation apparatus 51 includes key switches to be operated by the user to enter a command. The user operates the key switches to enter a command to a control unit 52. The entered command can be a command to select a content, a command to set information on embedment of a digital watermark or a command to specify a compression bit rate to mention a few. A display apparatus 53 displays information helping the user operate the equipment.

By virtue of the embodiments described above, it is possible to substantially reduce the cost of the processing carried out by the system and, hence, the price of the whole apparatus in comparison with a system in which a motion vector and a noise vision sensitivity are found only for the process to embed a digital watermark into a picture.

In the conventional system, a motion vector and a noise vision sensitivity are found for the process carried out by the conventional digital-watermark-embedding apparatus to embed a digital watermark into a picture in operations separated from operations to find a motion vector and a noise vision sensitivity for the process carried out by the conventional moving-picture compression apparatus to compress the picture including the embedded digital watermark. Thus, when the conventional digital-watermark-embedding function is added to the conventional moving-picture compression apparatus, the cost of the process to find a motion vector and a noise vision sensitivity is about twice the corresponding cost incurred by the conventional moving-picture compression apparatus.

If a digital-watermark-embedding function is added to a moving-picture compression apparatus in accordance with the methods provided by the embodiments described above, however, the cost of the process to find a motion vector and a noise vision sensitivity is the same as the corresponding cost incurred by the moving-picture compression apparatus and, hence, lower than the processing cost incurred as a result of addition of a digital-watermark-embedding function to the conventional moving-picture compression apparatus in accordance with the conventional method.

In accordance with the present invention, it is possible to avoid deteriorations of a digital watermark and to reduce the cost of the processes to embed a digital watermark into a picture and to compress the picture including the embedded digital watermark.

What is claimed is:

1. A digital-watermark-embedding apparatus for embedding a digital watermark into a content, said digital-watermark-embedding apparatus comprising:

a picture input unit for inputting said content;

a vision-sensitivity computation unit and a digital-watermark embedment unit, which are connected to said picture input unit;

a picture compression unit connected to said vision-sensitivity computation unit and said digital-watermark embedment unit, wherein said vision-sensitivity computation unit creates a noise-vision-sensitivity index from a variance of luminance values of a block included in a picture frame received from said picture input unit and outputs said noise-vision-sensitivity index to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit, and outputs said picture frame including said embedded digital watermark to said picture compression unit, and wherein said picture compression unit creates a quantization parameter on the basis of said noise-vision-sensitivity index received from said vision-sensitivity computation unit, and compresses said picture frame including said embedded digital watermark on the basis of said quantization parameter;

a motion-searching unit connected to said picture input unit, connected to said digital-watermark embedment unit as well as connected to said picture compression unit, wherein said motion-searching unit compares a specific block included in a picture frame received from said picture input unit with a block included in another picture frame received from said picture input unit to create a motion vector to be output to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit as well as said motion vector received from said motion-searching unit, and outputs said picture frame including said embedded digital watermark to said picture compression unit, wherein said picture compression unit creates a quantization parameter on the basis of said noise-vision-sensitivity index received from said vision-sensitivity computation unit, and compresses said picture frame including said embedded digital watermark on the basis of said quantization parameter as well as said motion vector received from said motion-searching unit, wherein said digital-watermark embedment unit includes a digital-watermark-embedment control unit as well as a motion-vector buffer unit, a vision-sensitivity buffer unit and a picture buffer unit, which are connected to said digital-watermark-embedment control unit, and wherein said digital-watermark-embedment control unit executes control so as to carry out a process of embedding a digital watermark into a picture frame after said motion vector is supplied to said motion-vector buffer unit, said noise-vision-sensitivity index is supplied to said vision-sensitivity buffer unit and said picture frame is supplied to said picture buffer unit;

a change-quantity computation unit connected to said motion-vector buffer unit and connected to said vision-sensitivity buffer unit; and a pixel-changing unit connected to said change-quantity computation unit and connected to said picture buffer unit, wherein after said motion vector is supplied to said motion-vector buffer unit and said noise-vision-sensitivity index is supplied to said vision-index buffer unit, said digital-watermark-embedment control unit outputs said motion vector and said noise-vision-sensitivity index to said change-quantity computation unit for use in computation of a pixel-change quantity, and wherein control is executed so as to carry out a process of embedding a digital watermark into a picture frame after said pixel-change quantity and said picture frame stored in said picture buffer unit are supplied to said pixel-changing unit.

2. A digital-watermark-embedding apparatus for embedding a digital watermark into a content, said digital-watermark-embedding apparatus comprising:

a picture input unit for inputting said content;

a vision-sensitivity computation unit and a digital-watermark embedment unit, which are connected to said picture input unit;

a picture compression unit connected to said vision-sensitivity computation unit and said digital-watermark embedment unit, wherein said vision-sensitivity computation unit creates a noise-vision-sensitivity index from a variance of luminance values of a block included in a picture frame received from said picture input unit and outputs said noise-vision-sensitivity index to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit, and outputs said picture frame including said embedded digital watermark to said picture compression unit, and wherein said picture compression unit creates a quantization parameter on the basis of said noise-vision-sensitivity index received from said vision-sensitivity computation unit, and compresses said picture frame including said embedded digital watermark on the basis of said quantization parameter;

a motion-searching unit connected to said picture input unit, connected to said digital-watermark embedment unit as well as connected to said picture compression unit, wherein said motion-searching unit compares a specific block included in a picture frame received from said picture input unit with a block included in another picture frame received from said picture input unit to create a motion vector to be output to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit as well as said motion vector received from said motion-searching unit, and outputs said picture frame including said embedded digital watermark to said picture compression unit, wherein said picture compression unit creates a quantization parameter on the basis of said noise-vision-sensitivity index received from said vision-sensitivity computation unit, and compresses said picture frame including said embedded digital watermark on the basis of said quantization parameter as well as said motion vector received from said motion-searching unit, wherein said picture compression unit includes a compression control unit as well as a motion-vector buffer unit, a vision-sensitivity buffer unit and a picture buffer unit, which are connected to said compression control unit, and wherein said compression control unit executes control so as to carry out a compression process after said motion vector is supplied to said motion-vector buffer unit, said noise-vision-sensitivity index is supplied to said vision-sensitivity buffer unit and a predetermined frame with blocks thereof including said embedded digital watermark is supplied to said picture buffer unit.

3. A digital-watermark-embedding apparatus for embedding a digital watermark into a content, said digital-watermark-embedding apparatus comprising:

a picture input unit for inputting said content;

a vision-sensitivity computation unit and a digital-watermark embedment unit, which are connected to said picture input unit;

a picture compression unit connected to said vision-sensitivity computation unit and said digital-watermark embedment unit, wherein said vision-sensitivity computation unit creates a noise-vision-sensitivity index from a variance of luminance values of a block included in a picture frame received from said picture input unit and outputs said noise-vision-sensitivity index to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit, and outputs said picture frame including said embedded digital watermark to said picture compression unit, and wherein said picture compression unit creates a quantization parameter on the basis of said noise-vision-sensitivity index received from said vision-sensitivity computation unit, and compresses said picture frame including said embedded digital watermark on the basis of said quantization parameter;

a motion-searching unit connected to said picture input unit, connected to said digital-watermark embedment unit as well as connected to said picture compression unit, wherein said motion-searching unit compares a specific block included in a picture frame received from said picture input unit with a block included in another picture frame received from said picture input unit to create a motion vector to be output to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit as well as said motion vector received from said motion-searching unit, and outputs said picture frame including said embedded digital watermark to said picture compression unit, wherein said picture compression unit creates a quantization parameter on the basis of said noise-vision-sensitivity index received from said vision-sensitivity computation unit, and compresses said picture frame including said embedded digital watermark on the basis of said quantization parameter as well as said motion vector received from said motion-searching unit;

wherein, if said input content is a static picture, said motion vector output by said motion-searching unit is set at a zero before being supplied to said digital-watermark embedment unit and said picture compression unit.

4. A digital-watermark-embedding apparatus for embedding a digital watermark into an input content, said digital-watermark-embedding apparatus comprising:
an input unit for inputting a compressed and encoded picture as said content;
a picture-decoding unit for carrying out a decoding process on said compressed and encoded picture received from said input unit;
a digital-watermark embedment unit for embedding a digital watermark into a picture obtained as a result of said decoding process carried out by said picture-decoding unit; and
a picture output unit for outputting a picture including said digital-watermark embedded by said digital-watermark embedment unit,
wherein said picture-decoding unit carries out a decoding process on an encoded motion vector and an encoded quantization parameter, which are included in said compressed and encoded picture, and outputs a motion vector and a quantization parameter, which are each obtained as a result of said decoding process, to said digital-watermark embedment unit, and
wherein said digital-watermark embedment unit embeds said digital watermark into said picture obtained as a result of said decoding process carried out by said picture-decoding unit on the basis of said motion vector and said quantization parameter, which are received from said picture-decoding unit.

5. A digital-watermark-embedding apparatus for embedding a digital watermark into a content, said digital-watermark-embedding apparatus comprising:
an input unit for inputting an encoded picture as said content;
a picture-decoding unit for carrying out a decoding process on said encoded picture received from said input unit;
a digital-watermark embedment unit for embedding a digital watermark into a picture obtained as a result of said decoding process carried out by said picture-decoding unit; and
a picture compression unit for compressing as well as encoding a picture including said digital-watermark embedded by said digital-watermark embedment unit and for outputting a compressed and encoded picture including said embedded digital watermark,
wherein said picture-decoding unit carries out a decoding process on an encoded motion vector and an encoded quantization parameter, which are included in said encoded picture, and outputs a motion vector and a quantization parameter, which are each obtained as a result of said decoding process, to said digital-watermark embedment unit and said picture compression unit,
wherein said digital-watermark embedment unit embeds said digital watermark into said picture obtained as a result of said decoding process carried out by said picture-decoding unit on the basis of said motion vector and said quantization parameter, which are received from said picture-decoding unit, and outputs a picture frame including said embedded digital watermark to said picture compression unit, and
wherein said picture compression unit compresses said picture including said digital-watermark embedded by said digital-watermark embedment unit on the basis of said motion vector and said quantization parameter, which are received from said picture-decoding unit.

6. A digital-watermark-embedding apparatus according to claim 4 or 5,
wherein, if said input unit receives a compressed and encoded picture including quantization parameters having values spread in accordance with a predetermined distribution, said output picture is a picture including said embedded digital watermark with embedment intensities, which are spread in accordance with a distribution matching said predetermined distribution of said quantization-parameter values.

7. A program embodied on a computer-readable medium, said program to be executed by a computer to carry out functions of:
a picture input unit for inputting a picture frame;
a motion-vector creation unit for creating a motion vector by comparison of a specific block included in said picture frame received from said picture input unit with a block included in another picture frame received from said picture input unit;
a vision-sensitivity computation unit for creating a noise-vision-sensitivity index from a variance of luminance values of said specific block included in said picture frame;
a digital-watermark embedment unit for embedding a digital watermark into said picture frame by changing luminance values of each block included in said picture frame on the basis of said noise-vision-sensitivity index received from said vision-sensitivity computation unit and said motion vector received from said motion-vector creation unit in order to create a picture frame including said embedded digital watermark;
a picture compression unit for creating a quantization parameter on the basis of said noise-vision-sensitivity index received from said vision-sensitivity computation unit as well as for compressing said picture frame including said embedded digital watermark on the basis of said quantization parameter and said motion vector received from said motion-vector creation unit;
a motion-searching unit connected to said picture input unit, connected to said digital-watermark embedment unit as well as connected to said picture compression unit,
wherein said motion-searching unit compares a specific block included in a picture frame received from said picture input unit with a block included in another picture frame received from said picture input unit to create a motion vector to be output to said digital-watermark embedment unit and said picture compression unit,
wherein said digital-watermark embedment unit embeds said digital watermark into said picture frame by changing luminance values of each block included in said picture frame on the basis of said noise-vision-sensitivity index received from said vision-sensitivity computation unit as well as said motion vector received from said motion-searching unit, and outputs said picture frame including said embedded digital watermark to said picture compression unit,
wherein said picture compression unit creates a quantization parameter on the basis of said noise-vision-sensitivity index received from said vision-sensitivity computation unit, and compresses said picture frame including said embedded digital watermark on the basis of said quantization parameter as well as said motion vector received from said motion-searching unit, wherein said digital-watermark embedment unit includes a digital-watermark-embedment control unit as well as a motion-vector buffer unit, a vision-sensitivity buffer unit and a picture buffer unit, which are connected to said digital-watermark-embedment control unit, and wherein said digital-watermark-embedment control unit executes control so as to carry out a process of embedding a digital watermark into a picture frame after said motion vector is supplied to said motion-vector buffer unit, said noise-vision-sensitivity index is supplied to said vision-sensitivity buffer unit and said picture frame is supplied to said picture buffer unit;

a change-quantity computation unit connected to said motion-vector buffer unit and connected to said vision-sensitivity buffer unit; and a pixel-changing unit connected to said change-quantity computation unit and connected to said picture buffer unit, wherein after said motion vector is supplied to said motion-vector buffer unit and said noise-vision-sensitivity index is supplied to said vision-index buffer unit, said digital-watermark-embedment control unit outputs said motion vector and said noise-vision-sensitivity index to said change-quantity computation unit for use in computation of a pixel-change quantity, and wherein control is executed so as to carry out a process of embedding a digital watermark into a picture frame after said pixel-change quantity and said picture frame stored in said picture buffer unit are supplied to said pixel-changing unit.

8. A program embodied on a computer-readable medium, said program to be executed by a computer to carry out functions of:

an input unit for inputting an encoded and compressed picture frame;

a picture-decoding unit for carrying out a decoding process on said encoded and compressed picture frame received from said input unit to extract a motion vector and a quantization parameter from said encoded and compressed picture; and a digital-watermark embedment unit for embedding a digital watermark into a picture frame obtained as a result of said decoding process carried out by said picture-decoding unit on the basis of said quantization parameter and said motion vector, which are received from said picture-decoding unit.

9. A program embodied on a computer-readable medium, said program to be executed by a computer to carry out functions of:

an input unit for inputting an encoded picture frame;

a picture-decoding unit for carrying out a decoding process on said encoded picture frame received from said input unit to extract a motion vector and a quantization parameter from said encoded picture;

a digital-watermark embedment unit for embedding a digital watermark into a picture frame obtained as a result of said decoding process carried out by said picture-decoding unit on the basis of said quantization parameter and said motion vector, which are received from said picture-decoding unit; and a picture compression unit for compressing a picture including said digital-watermark embedded by said digital-watermark embedment unit on the basis of said quantization parameter and said motion vector, which are received from said picture-decoding unit.

10. An information-processing system for inputting a compressed and encoded content and displaying said compressed and encoded content, said information-processing system comprising:

an input unit for inputting a compressed and encoded picture as said compressed and encoded content;

a picture-decoding unit for carrying out a decoding process on said compressed and encoded picture received from said input unit;

a digital-watermark embedment unit for embedding a digital watermark into a picture obtained as a result of said decoding process carried out by said picture-decoding unit; and a picture output unit for outputting a picture including said digital-watermark embedded by said digital-watermark embedment unit, wherein said picture-decoding unit also carries out a decoding process on an encoded motion vector and an encoded quantization parameter, which are included in said compressed and encoded picture, and outputs a motion vector and a quantization parameter, which are each obtained as a result of said decoding process, to said digital-watermark embedment unit, wherein said digital-watermark embedment unit embeds said digital watermark into said picture obtained as a result of said decoding process carried out by said picture-decoding unit on the basis of said motion vector and said quantization parameter, which are received from said picture-decoding unit, and wherein said display unit displays said picture including said embedded digital watermark.

11. An information distribution system connected to a network, said information distribution system comprising:

a picture input unit for inputting an encoded picture from said network;

a picture-decoding unit for carrying out a decoding process on said encoded picture received from said picture input unit;

a digital-watermark embedment unit for embedding a digital watermark into a picture obtained as a result of said decoding process carried out by said picture-decoding unit; and a picture compression unit for compressing as well as encoding a picture including said digital-watermark embedded by said digital-watermark embedment unit and for outputting a compressed and encoded picture including said embedded digital watermark, wherein said picture-decoding unit also carries out a decoding process on an encoded motion vector and an encoded quantization parameter, which are included in said encoded picture, and outputs a motion vector and a quantization parameter, which are each obtained as a result of said decoding process, to said digital-watermark embedment unit and said picture compression unit, wherein said digital-watermark embedment unit embeds said digital watermark into said picture obtained as a result of said decoding process carried out by said picture-decoding unit on the basis of said motion vector and said quantization parameter, which are received from said picture-decoding unit, and outputs a picture frame including said embedded digital watermark to said picture compression unit, and wherein said picture compression unit compresses said picture including said digital-watermark embedded by said digital-watermark embedment unit on the basis of said motion vector and said quantization parameter, which are received from said picture-decoding unit, and outputs said compressed picture including said embedded digital watermark to said network.

12. An integrated circuit for embedding a digital watermark into a content, said integrated circuit comprising:
- an input unit for inputting a compressed and encoded picture as said content;
- a picture-decoding unit for carrying out a decoding process on said compressed and encoded picture received from said input unit,
- a digital-watermark embedment unit for embedding said digital watermark into a picture obtained as a result of said decoding process carried out by said picture-decoding unit, and
- a picture output unit for outputting a picture including said digital-watermark embedded by said digital-watermark embedment unit,
- wherein said picture-decoding unit carries out a decoding process on an encoded motion vector and an encoded quantization parameter, which are included in said compressed and encoded picture, and outputs a motion vector and a quantization parameter, which are each obtained as a result of said decoding process, to said digital-watermark embedment unit, and
- wherein said digital-watermark embedment unit embeds said digital watermark into said picture obtained as a result of said decoding process carried out by said picture-decoding unit on the basis of said motion vector and said quantization parameter, which are received from said picture-decoding unit.

13. An integrated circuit for embedding a digital watermark into a content, said integrated circuit comprising:
- a picture input unit for inputting an encoded picture as said content;
- a picture-decoding unit for carrying out a decoding process on said encoded picture received from said picture input unit;
- a digital-watermark embedment unit for embedding said digital watermark into a picture obtained as a result of said decoding process carried out by said picture-decoding unit; and
- a picture compression unit for compressing as well as encoding a picture including said digital-watermark embedded by said digital-watermark embedment unit,
- wherein said picture-decoding unit also carries out a decoding process on an encoded motion vector and an encoded quantization parameter, which are included in said encoded picture, and outputs a motion vector and a quantization parameter, which are each obtained as a result of said decoding process, to said digital-watermark embedment unit and said picture compression unit,
- wherein said digital-watermark embedment unit embeds said digital watermark into said picture obtained as a result of said decoding process carried out by said picture-decoding unit on the basis of said motion vector and said quantization parameter, which are received from said picture-decoding unit, and
- wherein said picture compression unit compresses said picture including said digital-watermark embedded by said digital-watermark embedment unit on the basis of said motion vector and said quantization parameter, which are received from said picture-decoding unit.

14. A digital-watermark-embedding method of embedding a digital watermark into a content, said digital-watermark-embedding method comprising:
- a picture input process of inputting a compressed and encoded picture as said content;
- a picture-decoding process of, by use of a picture-decoding unit, carrying out a decoding operation on said compressed and encoded picture received from said picture input process as well as on an encoded motion vector and an encoded quantization parameter, which are included in said compressed and encoded picture, and outputting a motion vector and a quantization parameter, which are each obtained as a result of said decoding operation, to a digital-watermark embedment unit; and
- a digital-watermark-embedding process of, by use of said digital-watermark embedment unit, embedding said digital watermark into a picture obtained as a result of said decoding operation carried out in said picture-decoding process on the basis of said motion vector and said quantization parameter, which are received from said picture-decoding process.

15. A digital-watermark-embedding method of embedding a digital watermark into a content, said digital-watermark-embedding method comprising:
- a picture input process of inputting an encoded picture as said content;
- a picture-decoding process of, by use of a picture-decoding unit, carrying out a decoding operation on said encoded picture received from said picture input process as well as on an encoded motion vector and an encoded quantization parameter, which are included in said encoded picture, and outputting a motion vector and a quantization parameter, which are each obtained as a result of said decoding operation, to a digital-watermark embedment unit as well as a picture compression unit; and
- a digital-watermark-embedding process of, by use of said digital-watermark embedment unit, embedding said digital watermark into a picture obtained as a result of said decoding operation carried out in said picture-decoding process on the basis of said motion vector and said quantization parameter, which are received from said picture-decoding process; and
- a frame compression process of, by use of said picture compression unit, compressing a picture including said digital-watermark embedded in said digital-watermark-embedding process on the basis of said motion vector and said quantization parameter, which are received from said picture-decoding process.

16. A program embodied on a computer-readable medium, said program to be executed by a computer to carry out functions of:
- a picture input unit for inputting said content;
- a vision-sensitivity computation unit and a digital-watermark embedment unit, which are connected to said picture input unit;
- a picture compression unit connected to said vision-sensitivity computation unit and said digital-watermark embedment unit,
- wherein said vision-sensitivity computation unit creates a noise-vision-sensitivity index from a variance of luminance values of a block included in a picture frame received from said picture input unit and outputs said noise-vision-sensitivity index to said digital-watermark embedment unit and said picture compression unit,
- wherein said digital-watermark embedment unit embeds said digital watermark into said picture frame by changing luminance values of each block included in said picture frame on the basis of said noise-visionsensitivity index received from said vision-sensitivity computation unit, and outputs said picture frame including said embedded digital watermark to said picture compression unit, and wherein said picture compression unit creates a quantization parameter on the basis of said noise-vision-sensitivity index received from said vision-sensitivity computation unit, and compresses said picture frame including said embedded digital watermark on the basis of said quantization parameter;

a motion-searching unit connected to said picture input unit, connected to said digital-watermark embedment unit as well as connected to said picture compression unit, wherein said motion-searching unit compares a specific block included in a picture frame received from said picture input unit with a block included in another picture frame received from said picture input unit to create a motion vector to be output to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit as well as said motion vector received from said motion-searching unit, and outputs said picture frame including said embedded digital watermark to said picture compression unit, wherein said picture compression unit creates a quantization parameter on the basis of said noise-vision-sensitivity index received from said vision-sensitivity computation unit, and compresses said picture frame including said embedded digital watermark on the basis of said quantization parameter as well as said motion vector received from said motion-searching unit, wherein said digital-watermark embedment unit includes a digital-watermark-embedment control unit as well as a motion-vector buffer unit, a vision-sensitivity buffer unit and a picture buffer unit, which are connected to said digital-watermark-embedment control unit, and wherein said digital-watermark-embedment control unit executes control so as to carry out a process of embedding a digital watermark into a picture frame after said motion vector is supplied to said motion-vector buffer unit, said noise-vision-sensitivity index is supplied to said vision-sensitivity buffer unit and said picture frame is supplied to said picture buffer unit;

a change-quantity computation unit connected to said motion-vector buffer unit and connected to said vision-sensitivity buffer unit; and a pixel-changing unit connected to said change-quantity computation unit and connected to said picture buffer unit, wherein after said motion vector is supplied to said motion-vector buffer unit and said noise-vision-sensitivity index is supplied to said vision-index buffer unit, said digital-watermark-embedment control unit outputs said motion vector and said noise-vision-sensitivity index to said change-quantity computation unit for use in computation of a pixel-change quantity, and wherein control is executed so as to carry out a process of embedding a digital watermark into a picture frame after said pixel-change quantity and said picture frame stored in said picture buffer unit are supplied to said pixel-changing unit.

17. A program embodied on a computer-readable medium, said program to be executed by a computer to carry out functions of:

a picture input unit for inputting said content;

a vision-sensitivity computation unit and a digital-watermark embedment unit, which are connected to said picture input unit;

a picture compression unit connected to said vision-sensitivity computation unit and said digital-watermark embedment unit, wherein said vision-sensitivity computation unit creates a noise-vision-sensitivity index from a variance of luminance values of a block included in a picture frame received from said picture input unit and outputs said noise-vision-sensitivity index to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit, and outputs said picture frame including said embedded digital watermark to said picture compression unit, and wherein said picture compression unit creates a quantization parameter on the basis of said noise-vision-sensitivity index received from said vision-sensitivity computation unit, and compresses said picture frame including said embedded digital watermark on the basis of said quantization parameter;

a motion-searching unit connected to said picture input unit, connected to said digital-watermark embedment unit as well as connected to said picture compression unit, wherein said motion-searching unit compares a specific block included in a picture frame received from said picture input unit with a block included in another picture frame received from said picture input unit to create a motion vector to be output to said digital-watermark embedment unit and said picture compression unit, wherein said digital-watermark embedment unit embeds said digital watermark into said picture frame by changing luminance values of each block included in said picture frame on the basis of said noise-vision-sensitivity index received from said vision-sensitivity computation unit as well as said motion vector received from said motion-searching unit, and outputs said picture frame including said embedded digital watermark to said picture compression unit, wherein said picture compression unit creates a quantization parameter on the basis of said noise-vision-sensitivity index received from said vision-sensitivity computation unit, and compresses said picture frame including said embedded digital watermark on the basis of said quantization parameter as well as said motion vector received from said motion-searching unit, wherein said picture compression unit includes a compression control unit as well as a motion-vector buffer unit, a vision-sensitivity buffer unit and a picture buffer unit, which are connected to said compression control unit, and wherein said compression control unit executes control so as to carry out a compression process after said motion vector is supplied to said motion-vector buffer unit, said noise-vision-sensitivity index is supplied to said vision-sensitivity buffer unit and a predetermined frame with blocks thereof including said embedded digital watermark is supplied to said picture buffer unit.

* * * * *